(12) United States Patent
Tripp et al.

(10) Patent No.: US 6,976,053 B1
(45) Date of Patent: *Dec. 13, 2005

(54) METHOD FOR USING AGENTS TO CREATE A COMPUTER INDEX CORRESPONDING TO THE CONTENTS OF NETWORKED COMPUTERS

(75) Inventors: Gary W. Tripp, Bainbridge Island, WA (US); Michael D. Meadway, Snohomish, WA (US); Claude E. Duguay, Seattle, WA (US)

(73) Assignee: Arcessa, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/575,971

(22) Filed: May 23, 2000

Related U.S. Application Data

(63) Continuation-in-part of application No. 09/419,405, filed on Oct. 14, 1999, now Pat. No. 6,516,337.

(51) Int. Cl.$^7$ .......................... G06F 17/30; G06F 15/16
(52) U.S. Cl. ................... 709/202; 707/103 Z; 707/102
(58) Field of Search .............................. 707/100, 102, 707/103 R, 103, 103 Y, 103 Z, 10; 709/202

(56) References Cited

U.S. PATENT DOCUMENTS

| | | | | |
|---|---|---|---|---|
| 5,519,855 A | * | 5/1996 | Neeman et al. ................. | 707/3 |
| 5,748,954 A | * | 5/1998 | Mauldin ....................... | 707/10 |
| 5,781,896 A | * | 7/1998 | Dalal ........................... | 707/2 |
| 5,819,086 A | * | 10/1998 | Kroenke ...................... | 707/102 |
| 5,897,639 A | * | 4/1999 | Greef et al. ............. | 707/103 R |
| 5,991,762 A | * | 11/1999 | Nagarajayya et al. ....... | 707/100 |
| 6,202,070 B1 | * | 3/2001 | Nguyen et al. .......... | 707/104.1 |
| 6,516,337 B1 | * | 2/2003 | Tripp et al. ................. | 709/202 |

* cited by examiner

Primary Examiner—Greta Robinson
(74) Attorney, Agent, or Firm—Black Lowe & Graham PLLC

(57) ABSTRACT

A search engine utilizes a bottom-up approach to index the content of a network with agent programs running on each host computer instead of relying on a top-down approach as used by conventional search engines. A central catalog of object references is compiled on the central site or sites from the meta data reported from each web site. One or more brochure files may also be created and stored on each web site to provide conceptual or non-key-word data about the site, such as target demographics and categorization information. This conceptual information is then utilized in constructing the central catalog so that more accurate search results may be generated for search queries applied to the catalog.

37 Claims, 7 Drawing Sheets

METHOD FOR USING AGENTS TO CREATE A COMPUTER INDEX CORRESPONDING TO THE CONTENTS OF NETWORKED COMPUTERS

This application is a continuation-in-part of prior U.S. application Ser. No. 09/419,405, filed Oct. 14, 1999, now U.S. Pat. No. 6,516,337 priority from the filing date of which is hereby claimed under 35 U.S.C. §120.

TECHNICAL FIELD

The present invention relates to a method and system for using indexing agent programs running on host computers containing data objects within a network, such as the Internet, to generate and update an index or catalog of object references for those data objects.

BACKGROUND

In the last several years, the Internet has experienced exponential growth in the number of web sites and corresponding web pages contained on the Internet. Countless individuals and corporations have established web sites to market products, promote their firms, provide information on a specific topic, or merely provide access to the family's latest photographs for friends and relatives. This increase in web sites and the corresponding information has placed vast amounts of information at the fingertips of millions of people throughout the world.

As a result of the rapid growth in web sites on the Internet, it has become increasingly difficult to locate pertinent information in the sea of information available on the Internet. A search engine, such as Inktomi, Excite, Lycos, Infoseek, or FAST, is typically utilized to locate information on the Internet. FIG. 1 illustrates a conventional search engine 10 including a router 12 that transmits and receives message packets between the Internet and a web crawler server 14, an index server 16, and a web server 18. A web crawler or spider is a program that roams the Internet, accessing known web pages, following the links in those pages, and parsing each web page that is visited to thereby generate index information about each page. The index information from the spider is periodically transferred to the index server 16 to update the catalog or central index stored on the index server. The spider returns to each site on a regular basis, such as every several months, and once again visits web pages at the site and follows links to other pages within the site to find new web pages for indexing.

The central index contains information about every web page the spider has found. Each time the spider visits a web page, the central index is updated so that the central index contains the latest information about each web page.

The web server 18 includes search software that processes search requests applied to the search engine 10. The search software searches the millions of records contained in the central index in response to a search query transferred from a user's browser over the Internet and through the router 12 to the web server 18. The search software finds matches to the search query and may rank them in terms of relevance according to predefined ranking algorithms, as will be understood by those skilled in the art.

As the number of web sites increases, it becomes increasingly difficult for the conventional search engine 10 to maintain an up-to-date central index. This is because it takes time for the spider to access each web page, so as the number of web pages increases it accordingly takes the spider more time to index the Internet. In other words, as more web pages are added, the spider must visits these new web pages and add them to the central index. While the spider is busy indexing these new web pages, it cannot revisit old web pages and update portions of the central index corresponding to these pages. Thus, portions of the central index become dated, and this problem is exacerbated by the rapid addition of web sites on the Internet.

The method of indexing utilized in the conventional search engine 10 has inherent shortcomings in addition to the inability to keep the central index current as the Internet grows. For example, the spider only indexes known web sites. Typically, the spider starts with a historical list of sites, such as a server list, and follows the list of the most popular sites to find more pages to add to the central index. Thus, unless your web site is contained in the historical list or is linked to a site in the historical list, your site will not be indexed. While most search engines accept submissions of sites for indexing, even upon such a submission, it may be months before the spider gets to the site for indexing.

Another inherent shortcoming of the method of indexing utilized in the conventional search engine 10 is that only Standard General Markup Language (SGML) information (including specific variations such as HGML and XML) is utilized in generating the central index. In other words, the spider accesses or renders a respective web page and parses only the SGML information in that web page in generating the corresponding portion of the central index. Due to limitations in the format of an SGML web page, certain types of information may not be placed in the SGML document. For example, conceptual information such as the intended audience's demographics or geographic location may not be placed in an assigned tag in the SGML document. Such information would be extremely helpful in generating a more accurate index. For example, a person might want to search in a specific geographical area, or within a certain industry. By way of example, assume a person is searching for a red barn manufacturer in a specific geographic area. Because SGML pages have no standard tags for identifying industry type or geographical area, the spider on the server 14 in the conventional search engine 10 does not have such information to utilize in generating the central index. As a result, the conventional search engine 10 would typically list not only manufacturers but would also list the location of picturesque red barns in New England that are of no interest to the searcher.

There are four methods for updating centrally stored data or a central database from remotely stored data on a network: 1) all of the remotely stored data is periodically copied over the network to the central location, 2) only those files or objects that have changed are copied to the central location, 3) a transaction log is kept at the remote location, transmitted to the central location, and used by a program on the central computer to determine how to update the central location's copy of the data, and 4) a differential is created by comparing the remotely stored historic copy and the current remotely stored copy and sent to the central location for incorporation into the centrally stored historic copy of the data. All of these methods rely on duplicating the remote data. Conventional search engines employ the first method, periodically copying each web page to the central site where they are parsed to generate index data. The index data is stored with a reference or link to the remote data, and the copy of the page is discarded.

At least one Internet search engine company, Infoseek, has proposed a distributed search engine approach to assist the spidering programs in finding and indexing new web pages. Infoseek has proposed that each web site on the Internet create a local file named "robots1.txt" containing a list of all files on the web site that have been modified within the last twenty-four hours. A spidering program would then download this file and, from the file, determine which pages on the web site should be accessed and reindexed. Files that have not been modified will not be copied to the central site for indexing, saving bandwidth on the Internet otherwise consumed by the spidering program copying unmodified pages, thus increasing the efficiency of the spidering program. Additional local files could also be created, indicating files that had changed in the last seven days or thirty days or containing a list of all files on the site that may be indexed. Under this approach, only files in html format, portable data format, and other file formats that may be accessed over the Internet are placed in the list since the spidering program must be able to access the files over the Internet. This use of local files on a web site to provide a list of modified files has not been widely adopted, if adopted by any search engine companies at all.

In addition to their search engine sites maintained on the Internet, several search engine companies, such as AltaVista® and Excite, have developed local or web server search engine programs that locally index a user's computer and integrate local and Internet searching. At present, a typical user will use the "Find" utility within Windows to search for information on his personal computer or desktop, and a browser to search the Internet. As local storage for personal computers increases, the Find utility takes too long to retrieve the desired information, and then a separate browser must be used to perform Internet searches. The AltaVista® program is named AltaVista® Discovery, and generates a local index of files on a user's personal computer much like the central index. The program then provides integrated searching of the local index along with conventional Internet searches using the central index of the AltaVista® search engine.

The AltaVista® Discovery program includes an indexer component that periodically indexes the local set of data defined by the user and stores pertinent information in its index database to provide data retrieval capability for the system. The program generates a full indexing at the time of installation, and thereafter incremental indexing is performed to lower the overhead on the computer. In building the local index, the indexer records relevant information, indexes the relevant data set, and saves each instance of all the words of that data, as well as the location of the data set and other relevant information. The indexer handles different data types including Office'97 documents, various types of e-mail messages such as Eudora, Netscape, text and PDF files, and various mail and document formats. The indexer also can retrieve the contents of an html page to extract relevant document information and index the document so that subsequent search queries may be applied on indexed documents.

A program offered by Excite, known as Excite for Web Servers ("EWS"), gives a web server the same advanced search capabilities used by the Excite search engine on the Internet. This program generates a local search index of pages on the web server, allows visitors to the web server to apply search queries, and returns a list of documents ranked by confidence in response to the search queries. Since the program resides on the web server, even complex searches are performed relatively quickly because the local search index is small relative to the index of the world-wide-web created by conventional search engines on the Internet.

The local search engine utilities just described are programs that execute on a web server or other computer to assemble information or "meta data" about files or other objects on that computer. The assembled meta data is retained and used at the computer where the meta data is assembled. There is a need for a method for indexing or cataloging remotely stored data that eliminates the need to copy the remote data to a central location and for indexing the world wide web that eliminates the need for spiders to be utilized in updating the index. There is a need to allow conceptual information to be utilized in generating the index to make search results more meaningful.

A few simple programs are known that execute on a computer, assemble information about files or other objects on the computer, and then send the information across a network where it is aggregated. These programs generally operate without the consent of the computer owner and are designed to collect and transmit information obtained from files on the owner's computer.

One such program is loaded without the user's knowledge and reports information about the user or programs installed on the computer or the user's usage habits to another computer across the Internet for data collection purposes. There have been several well-publicized cases of major software companies including code in application programs which perform this sort of function when a computer is attached to the Internet. Usually (though not always), the software companies in question have published information which informs users of means by which this activity may be halted.

Another program of this type is a virus that affects only Internet servers, usually UNIX based, which have lax security administration. This type of virus is known as a "mail relay virus", and is designed to use system resources for forwarding bulk unsolicited email. The virus program is loaded by a person who manages to pierce the root account security and copy a series of programs to a hidden directory on the system. These programs contain a list of machines which are known to have the same program installed and their TCP/IP addresses. The program then discovers (via system configuration files) what the upstream email server is for the local system, and begins accepting and forwarding bulk email through the system. Typically, most Internet service providers do not allow incoming mail from someone outside of the subnetwork that the mail server is on, hence the need to infect a machine on that subnetwork. Once the programs are loaded, the TCP/IP address of the infected machine is sent back to the developer of the virus and is incorporated in future versions.

Another program of this type is known as the W97M/Marker.C virus. This Word 97 macro virus affects documents and templates and grows in size by tracking infections along the way and appending the victim's name as comments to the virus code. Files are written to the hard drive on infected systems: one file prefixed by C:\HSF and then followed by random generated eight characters and the .SYS extension, and another file named "c:\netIdx.vxd". Both files serve as ASCII temporary files. The .SYS file contains the virus code and the .VXD file is a script file to be used with FTP.EXE in command line mode. This ftp script file above is then executed in a shell command sending the virus code which now contains information about the infected computer to the virus author's web site called "CodeBreakers."

SUMMARY OF THE INVENTION

The present invention utilizes a bottom-up approach with an indexing agent program pushing from source computers to the central computer to index or catalog objects on a network, rather than a top-down approach of seeking each source from a central computer, as used by conventional search engines. The network that is indexed may be any network, including the global computer network which is known as the Internet or the world wide web. The result of indexing is a catalog of object references. Each object reference is a pointer which specifies a location or address where the object may be found. For purposes of the following discussion, each object consists of both contents (meaning only the essential data itself and not a header) and associated "meta data". The meta data includes all information about the contents of an object but not the contents itself. The meta data includes any information that has been extracted from the contents and is associated with the object, any header information within the object, and any file system information stored outside of the object such as directory entries. The term "object" is used only to refer to anything stored on a site of interest to a person who might access the site from the network and its associated meta data. To avoid confusion, the term "object" is not used more broadly.

According to one aspect of the present invention, instead of using a central site including spidering software to recursively search all linked web pages and generate an index of the Internet, independent distributed indexing agent programs are located at each web host and report meta data about objects at the web host to the central server. A web host is the physical location of one or more web sites. A central catalog of object references is compiled on the central site from the meta data reported from the agent program on each web host.

According to another aspect of the present invention, one or more brochure files are created and stored within each web site to provide conceptual or non-keyword data about the site, such as demographic targets and categorization information, related to one or more parts of the web site. This conceptual information is then utilized in constructing the central catalog so that more accurate search results may be generated in response to search queries applied to the catalog.

According to another aspect of the present invention, a method constructs a searchable catalog of object references to objects stored on a network. The network includes a plurality of interconnected computers with at least one computer storing the catalog. Each computer that stores the catalog is designated a cataloging site. The other computers on the network store a plurality of objects and are each designated a source site. The method includes running on each source site an agent program that processes the contents and the meta data related to objects stored on the source site, thereby generating meta data describing the object for each object that is processed. The generated meta data is transmitted by the agent program on each source site to at least one cataloging site. The transmitted meta data is then aggregated at the cataloging site to generate the catalog of object references. Each source site may also be a cataloging site, and each item of transmitted meta data may also include a command to the cataloging site instructing the cataloging site what to do with the item of meta data.

According to another aspect of the present invention, a method constructs a searchable catalog of file references on a cataloging computer on a computer network. The network includes a plurality of interconnected source computers each having a file system for identifying files. The method includes running on each source computer an agent program that accesses the file system of the source computer, thereby identifying files stored on the source computer and collecting information associated with the identified files. The collected information is transmitted from each source computer to the cataloging computer. The transmitted collected information is then processed at the cataloging IBM computer to generate a catalog of file references. The collected information may be a digital signature of each identified file, information from meta data for the file such as file names or other directory entries, or any form of object reference. The collected information may be transmitted responsive to a request from the cataloging computer or at the initiation of the source computer.

According to a further aspect of the present invention, a method constructs a searchable catalog of object references on a cataloging computer on a computer network. The computer network further includes a plurality of interconnected source computers. The method includes running on each source computer an agent program that accesses a file system structure of the source computer and creates a data set specifying the file system structure. At the initiation of the source computer, the data set is transmitted from the source computer to the cataloging computer. The transmitted data sets are then processed at the cataloging computer to generate the catalog of object references. The file system structure may include a plurality of directory entries for files stored on the corresponding source computer.

According to another aspect of the present invention, a method constructs a searchable catalog of object references from objects stored on a network. The network includes a plurality of interconnected computers with one computer storing the catalog and being designated a cataloging site and each of the other computers storing a plurality of objects and being designated a source site. The method includes running on each source site an agent program that assembles meta data about objects stored on the source site. The assembled meta data is transmitted from each source site to the cataloging site at a scheduled time that is a function of resource availability on one or both of the source site and the cataloging site. The transmitted data is then processed at the cataloging site to generate a catalog of object references. According to another aspect of the present invention, the source site agent program may be scheduled to run at times that are determined by resource availability on the source site and the assembled meta data may be transmitted independently of resource availability. The assembled meta data may be differential meta data indicating changes in current meta data relative to previous meta data.

A further aspect of the present invention is a method of monitoring objects stored on a network to detect changes in one or more of the objects. The network includes a plurality of interconnected computers with one computer assembling the results of monitoring and being designated a central site. Each of the other computers stores a plurality of objects and is designated a source site. The method includes running on each source site an agent program that assembles meta data about objects stored on the source site. The assembled meta data is compared on the source site to meta data previously assembled to identify changes in the meta data. Portions of the assembled meta data that have changed are then transmitted from each source site to the central site. The changes may be transmitted according to a predetermined schedule, and the meta data may include object references and/or a digital signature for each object.

Another aspect of the present invention is a second method for monitoring objects stored on a network to detect changes in one or more of the objects. The network includes a plurality of interconnected computers with one computer assembling the results of the monitoring and being designated a central site and each of the other computers storing a plurality of objects and being designated a source site. The method includes running on each source site an agent program that processes objects stored on the source site and generates for each processed object a digital signature reflecting data of the object where the data consists of the contents or meta data of the object. The generated signatures are transmitted from each source site to the central site. Each transmitted signature is then compared at the central site to a previously generated signature for the object from which the signature was derived to determine whether the data of the object has changed. Either the source site or the central site may initiate running of the agent program on the source site. The objects on the source site that are monitored may be accessible only from the source site and not accessible by other sites on the network. The digital signature for each object may consist of information copied from a directory entry for the object, or may consist of a value generated as a function of the contents of the object or any other set of information that reflects changes to the object. This method may be implemented with traditional spidering so that only objects which have changed need to once again be spidered and parsed.

Another aspect of the present invention is a method of constructing a catalog of object references to objects on a site in a network having a plurality of sites. The objects on a site are not accessible to other sites in the network. The method includes running on the site an agent program that generates meta data from the contents of objects on the site and assembling the meta data to construct the catalog of object references. The catalog may be stored on the same site as the objects, or the catalog may be assembled on a central site that is not the same site where the objects are located. The object references may remain in the catalog even though the object relating to a particular object reference no longer exists on the corresponding site in the network.

To generate the meta data, the agent program may extract features or vectors that characterize the contents of objects such as image files, audio files, or video files. The agent program may use artificial intelligence reasoning or a conceptual ontology to generate the meta data that is sent to the central site. It may extract and send to the central site meta data in the form of URL links gathered from pages of links.

Each of the previously recited methods may be performed by a program contained on a computer-readable medium, such as a CD-ROM. The program may also be contained in a computer-readable data transmission medium that may be transferred over a network, such as the Internet. The data transmission medium may, for example, be a carrier signal that has been modulated to contain information corresponding to the program.

DETAILED DESCRIPTION OF THE INVENTION

Figure 1:
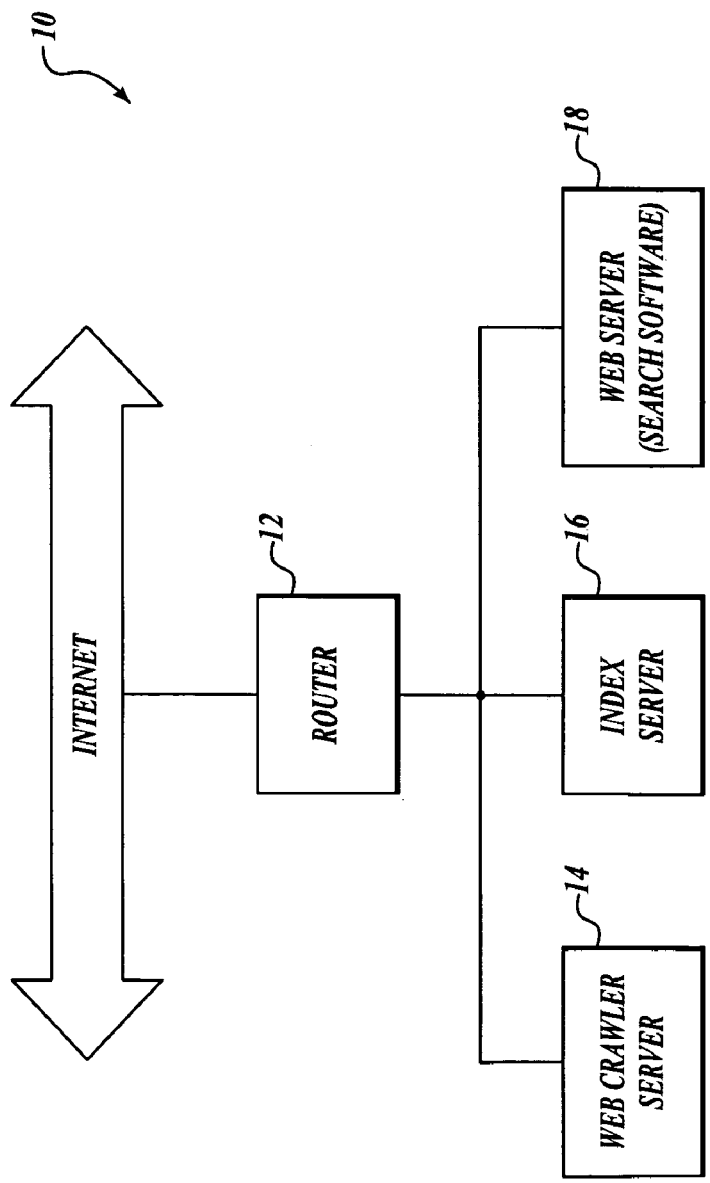
FIG. 1 is a functional block diagram of a conventional search engine for the world wide web.
Figure 2:
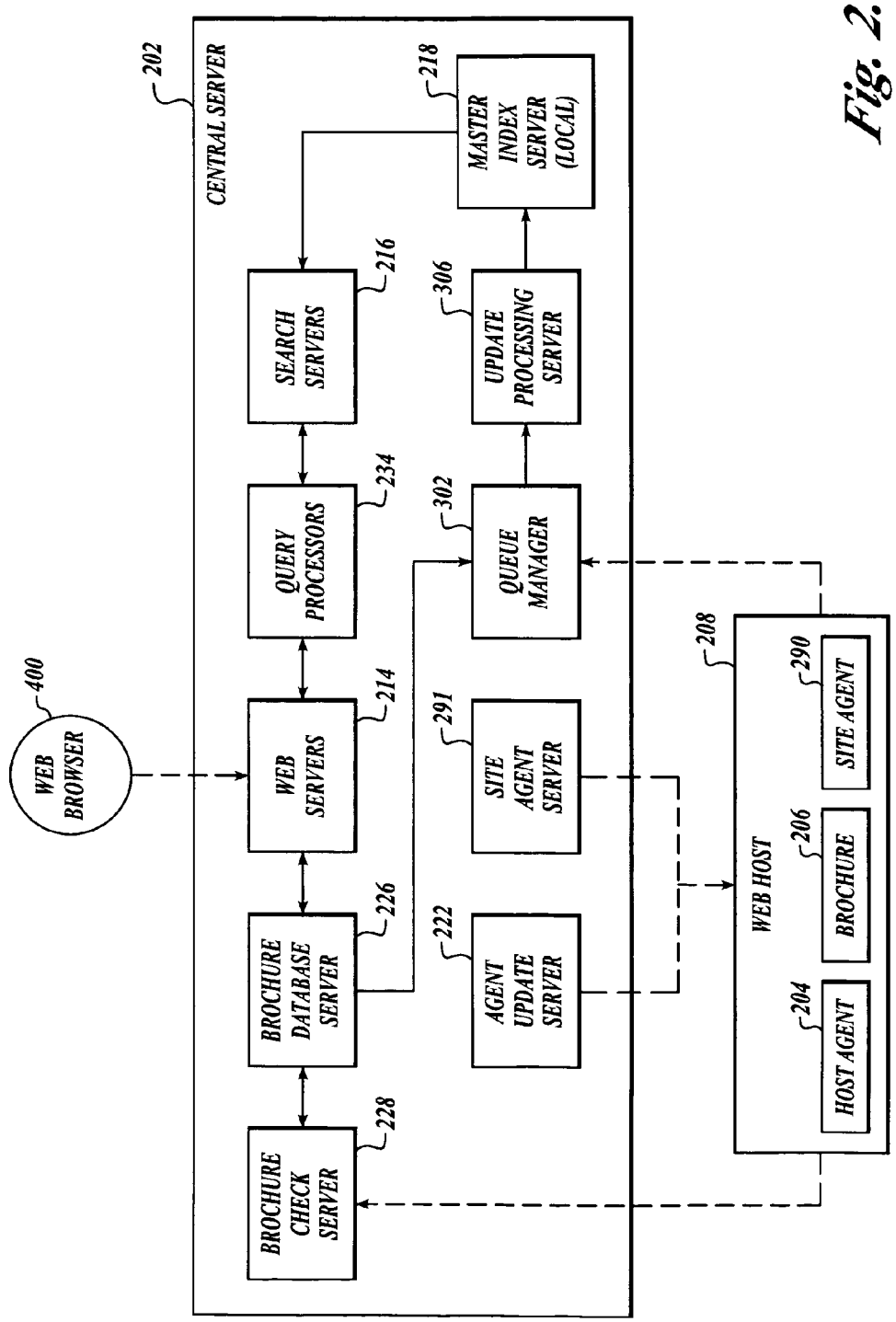
FIG. 2 is block diagram showing the architecture of a search engine for indexing the world wide web according to one embodiment of the present invention.

FIG. 2 is a block diagram of an indexing system for indexing a network such as the Internet according to one embodiment of the present invention. The system includes a central server 202 that stores a central index and processes search queries received over the Internet. The system further includes a plurality of agent programs or agents 204, 290 that reside on respective remote web host servers 208, each of the agents processes objects contained on the remote server and provides index update information to the central server 202 which, in turn, updates the central index to include the updated information. The central server 202 need not access and parse objects stored on the remote servers 208, as in a conventional spidering search engine as previously described. Instead, each of the agents 204, 290 processes objects present on the corresponding remote server 208 and transfers information about such objects to the central server 202.

The system also includes brochure files or brochures 206 residing on respective remote servers 208, each brochure file containing general or conceptual information about the web site for use in generating the central index on the central server 202. The agents 204, 290, brochures 206, and overall operation of the system will explained in more detail below. In FIG. 2, only one remote server 208 and the corresponding agents 204, 290 and brochure 206 are shown for the sake of brevity, but the system typically includes numerous such remote servers 208, agents, and brochures.

The components of the central server 202 and their general operation have been described, and now the operation of the agent and brochure will be described in more detail. A host agent 204, any number of site agents 290, and any number of brochures 206 may be present at a remote server 208. A brochure 206 and an agent can function independently of each other, as will be discussed in more detail below.

Agent Overview

The agent 204, 290 is a small local program which executes at the remote server 208 and generates an incremental search engine update for all of the participating web sites on the web host 208. These index updates are transmitted by the agent to the central server 202, where they are queued for addition to the central index.

The agents 204, 290 run on a web host server and process content (objects) for all content available via mass storage. The agents use the local web server configuration (object catalog or file system information) data to determine the root directory path (or other location information for the particular file system) for all web site file structures available. The agents 204, 290 read files directly from local mass storage and index the keywords from the files and meta data about the files. In contrast, a spider program, as previously discussed, is located on a server remote from the local site and renders each web page file before tokenizing and parsing each page for indexing. The agents 204, 290 follow the structure of the local mass storage directory tree in indexing the files, and do not follow uniform resource locators ("URLs") stored within the HTML files forming the web pages. Since the agents are present at the remote server 208 and have access to files stored on the server's mass storage, the agents are capable of retrieving non-html data for indexing from these locally stored files, such as database files and other non web-page source material. For example, a product catalog stored in a database file on the remote mass storage may be accessed and indexed by an agent.

The host agent 204 and site agent 290 represent two embodiments of the agent technology. The host agent 204 is installed on the host computer by the administrator or manager of the host computer, and has access to all file system content for a multiplicity of sites stored on the host computer. The host agent 204 processes all web sites located within the mass storage area to which it has access, unless configured to exclude some portion of a site or sites. In contrast, the site agent 290 is installed on the host computer by the owner or administrator of one or more individual sites, and is limited to processing files stored within the file system areas allotted to the sites for which it was installed.

The purpose of the site agent 290 is to provide a means for a site owner or administrator to participate in the provision of data to the central index through the use of the agent technology if the host computer on which the site for which the agent was installed does not contain a working host agent 204. The site agent 290 is typically embodied as a small program installed in a specialized area of a site which provides the ability to generate dynamic content via activation of a program from an outside event. For example, the site agent 290 might be installed in the "cgi-bin" area of a web site. At periodic intervals, a component of the central server 202 causes the site agent 290 to be activated by opening a communications link to the site agent 290 and providing initialization data via the link. Under current standardized implementations of HTTP (Hypertext Transfer Protocol) server systems, this involves opening a TCP/IP (Transmission Control Protocol/Internetworking Protocol) connection to the web server handling the site and requesting the execution of the site agent 290 as a CGI (Common Gateway Interface) script using the HTTP data format protocols. During and at the end of performing processing procedures, the site agent 290 transmits the data for the site in which it is placed to the various components of the central server 202. The site agent 290 may be implemented in such a way as to permit activation and control by methods other than those described above.

In contrast to the host agent 204, the site agent 290 is limited in capability and scope. It has access only to those files stored in the file system immediately available to the site for which the site agent 290 was installed. Moreover, it typically has limited local storage permissions and is not allowed to remain dormant between processing periods. Finally, given that in many implementations computing resources are usually restricted, the site agent 290 will most typically perform a subset of the operations performed by the host agent 204.

Finally, in the preferred embodiment, the site agent 290 is not activated once a host agent 204 has been installed on the host containing the site where the site agent 290 is stored. There may be multiple site agents 290 stored on a single host, all of which may be activated periodically by components of the central server 202 prior to the installation of a host agent 204.

Brochure Overview

While indexing the web sites at the remote server 208, the agent 204, 290 recognizes brochures 206 stored at web sites on the server, and provides index updates based on the contents of the brochures found. The brochure 206 is a small file that may contain conceptual and other general information that would be useful to improve the indexing of sites or parts of a single site on the remote server 208. A brochure 206 may contain any information pertinent to the web site, including but not limited to keywords, phrases, categorizations of content, purpose of the site, and other information not generally stored in a web page. The brochure 206 is generated manually by individual web site administrators. The administrator fills out a form at the central server 202, and receives an email containing the brochure 206 or downloads the brochure after submitting the form contents. Upon receiving the brochure 206, the administrator stores it within the file structure of the web site on the remote server 208. There may be multiple brochures 206 at the same web site, each describing specific portions of the site. Each brochure 206 may refer to a single web page or a group of web pages stored within a specific subdirectory at the web site. All information stored in each brochure 206 is applied to the pages referenced in the brochure.

The central server 202 includes a brochure database server 226 and brochure check server 228. The brochure database server 226 stores a brochure database as a list of brochures and their associated data fields for each web site. The web servers 214 may request records from or add records to this brochure database depending on the actions taken by web site administrators while maintaining their brochure entries. The brochure check server 228 periodically checks for valid new brochures as defined within the brochure database server for web sites that are not being processed by a local agent program. If the defined brochure in the brochure database server 226 is not found by the brochure check server 228, a notification is sent to the administrator of the site where the brochure was supposed to be found.

When a brochure file is requested for a site which is not served by an agent, a message is sent to the Internet Service Provider ("ISP") or system administrator for the site hosting the web site, indicating that users of the system are requesting brochures. The central server, or the agent 204, 290 when present on the site, also periodically checks the validity of existing brochures on all sites and notifies the web site administrator if a brochure file is missing. If a brochure is missing and remains missing for a given number of check cycles, the brochure check server 228 sends a request to the brochure database server 226 to delete the entry for the brochure. The brochure check server 228 detects any changes in brochures, such as additions or removals, and converts these changes to transaction batches that are forwarded to a queue manager which, in turn, applies these changes to update the central index on the master index server 218, as will be described in more detail below. The brochure check server 228 periodically verifies the status of all brochures at sites that are not being indexed by an agent 204.

Transaction Processing Overview

Once the agent 204, 290 has indexed the web sites at the remote server 208, the agent transmits a transaction list to the central server 202, and this transaction list is stored on one of the agent update servers 222. The transaction list is referred to as a batch, and each batch contains a series of deletion and addition transactions formatted as commands. More specifically, each batch represents an incremental change record for the sites at the remote server 208 serviced by the agent 204, 290. The update server 222 thereafter transfers each batch to the master index server 218 which, in turn, updates the master index to reflect the index changes in the batch. In the preferred embodiment, the agent 204, 290 transmits only "incremental" changes to the central server 202. In contrast, a conventional spider program requests the entire HTML page from the remote web site via the remote server 208, and then parses the received page for keyword information.

Central Server Operation

The overall operation of the central server 202 will now be described in more detail with reference to the functional block diagram of FIG. 2. In operation, the central server 202 performs three primary functions: 1) processing search queries from remote users; 2) brochure generation and verification; and 3) index update processing.

In processing search queries from remote users, the web servers 214 receive search queries from remote user browsers. The web servers send the query to a query processor which parses the query and sends it to the index servers 216. The index servers thereafter return search results to the web server 214, which, in turn, returns the search results to the remote user browser.

The central server 202 also performs index update processing to update the central index stored on the master storage server 218 and the segmented central index stored on the index servers 216, as will now be described in more detail. As described above, the queue manager receives update transaction batches from the brochure check server 228 and the agent update server 222. The agent update server 222 receives queries from the agent as to the current state of the agent's version and the status of the last index updates of the site. If the agent is not of a current version, a current version is automatically transmitted and installed. If the state of the site indexing is not consistent as indicated by a match of the digital signatures representing state of the site and the state of the central index the last time an update was received and successfully processed and added to the central index, then the agent will roll back to a previous state and create the necessary additions and deletions to bring the state of the site and the central index into agreement. The agent 204, 290 will then sent the additions and deletions along with a current digital signature to the queue manager 302. The queue manager 302 receives incremental index updates from the agents 204 present on the remote servers 208 and converts these updates into update transaction batches which, in turn, are transferred to the update processing manager 306. The queue manager 302 also periodically transmits a copy of the stored transaction batches to the update processing server 306. The queue manager 302 stores update transaction batches received from the agent 204 during a predetermined interval, and, upon expiration of this interval, the update batches are transferred to the update processing server 306. Upon receiving the update transaction batches, the update processing server 306, applies all the batches to update the central index stored on the master storage server 218. Once the central index stored on the master storage server 218 has been updated, the master storage server 218 applies the update transaction batches to update the segmented central index stored on the index servers 216.

Figure 3:
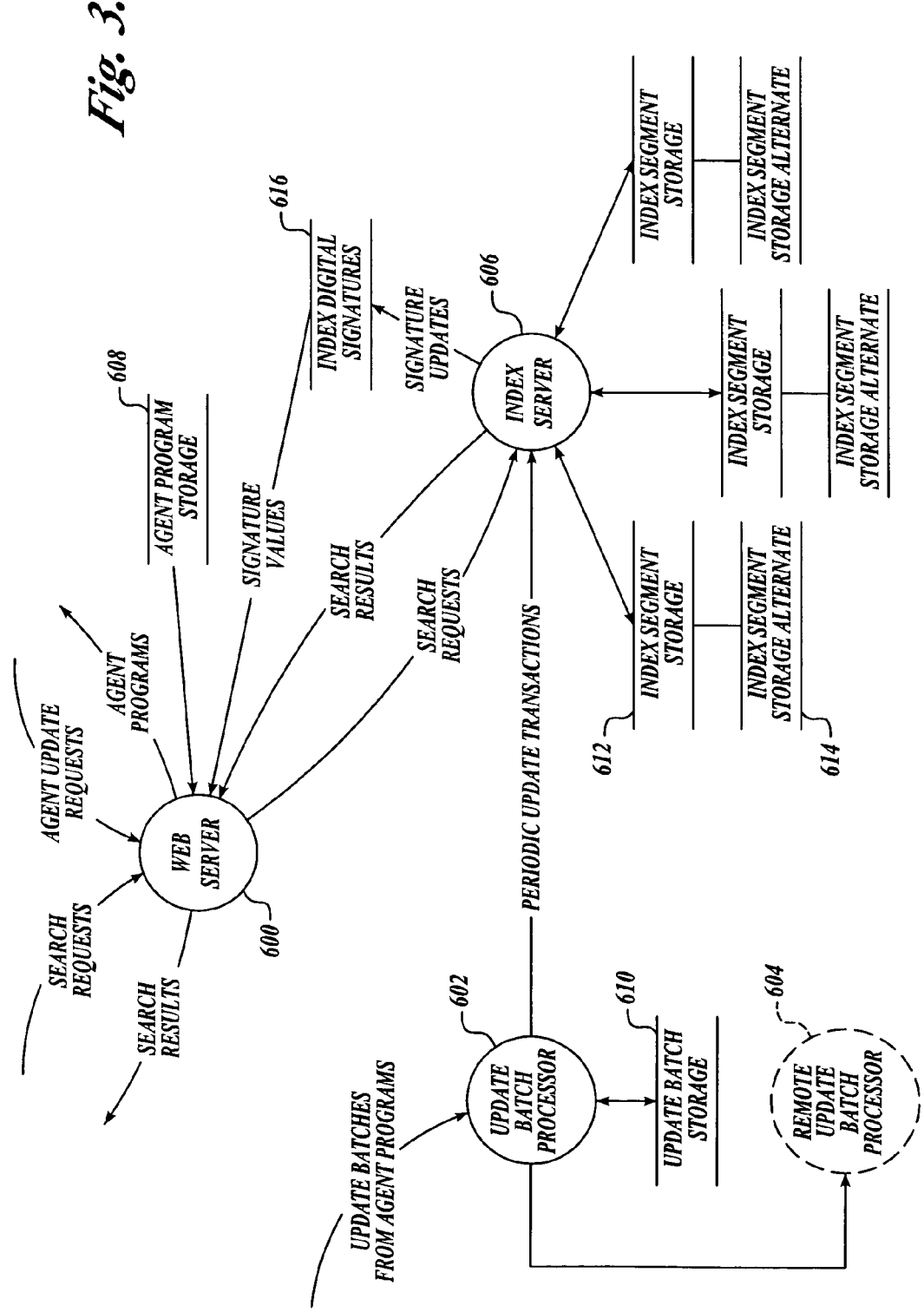
FIG. 3 is a functional block diagram of an alternative search engine for indexing the world wide web according to another embodiment of the present invention.

FIG. 3 is a functional data flow diagram illustrating an alternative embodiment of the central cataloging site of FIG. 2. In FIG. 3, a web server 600 is the main gateway for all agent program update requests, agent program downloads, and search requests. An update batch processor 602 receives, stores, and applies update batches created by remote agents, and also transmits copies of the batches to redundant remote catalog sites. A remote update batch processor 604 receives and applies batches received from a master catalog site to a local index server for the purposes of redundancy. An index server 606 stores all search index information in a series of database segments and creates result sets from queries applied to it as a result of search requests received by the web server 600.

The system of FIG. 3 includes an agent program storage area 608 containing copies of agent programs and the digital signatures of those programs for the various host operating systems which use agents to generate web site updates. An update batch storage area 610 contains the received update batches transmitted by agent programs on remote hosts, and these batches are deleted after processing. An index segment storage area 612 contains a subset of the total index database for the index server 606. An index signature storage area 616 stores the current digital signature of the index for a particular site serviced by an agent on a remote host.

In operation of the system of FIG. 3, the agent program, upon starting on a remote host, will query the web server 600 to determine if the local agent program digital signature matches that of the agent program digital signature stored at the catalog site. If the local agent program determines that the digital signatures of the agent programs do not match, the agent program will retrieve a new copy of itself from the web servers 600 and restart itself after performing the appropriate local operations. Before commencing local processing, the agent program checks the digital signature of the existing site index on the catalog site with the digital signature of the site stored locally. If the two signatures match, a differential transmission of catalog information will occur. Otherwise, the entire catalog will be regenerated and transmitted, and the catalog site will be instructed to delete any existing catalog entries for the site. Once a differential or full catalog update has been generated, the agent program contacts the update batch processor 602 at the catalog site and transmits the contents of the update. Upon receiving confirmation of receipt, the agent program performs clean up and post-processing operations, then suspends itself until the next processing cycle.

Brochure Processing in Detail

As shown in FIG. 2, the central server 202 allows remote users to generate and download brochures 206 to their remote site, and also verifies the validity of brochures 206 on web sites not serviced by an agent, as will now be explained in more detail. The web servers 214 receive and process brochure generation or modification requests from user browsers. Once the brochure has been generated or modified by the central server, the brochure is transferred to the brochure database server 226, which stores all existing brochures. A brochure check server periodically checks for new brochures stored on the brochure database server 226 for web sites that are not served by an agent. When a brochure 206 is requested for web site that is not served by an agent, the brochure check server sends a message to the system administrator or Internet service provider for the server hosting the web site telling them that site administrators on their server are requesting brochures. The brochure check server also periodically verifies the validity of existing brochures 206 on all sites not serviced by an agent 204. If a brochure 206 is missing for a predetermined number of verification cycles, the brochure check server instructs the brochure database server 226 to delete the entry for that brochure. The brochure check server also converts any modifications, additions, or deletions to brochures 206 to transaction batches, and forwards these transaction batches to the queue manager 302. The queue manager 302 receives brochure update transaction batches from the brochure check server and also receives agent update transaction batches from the agent update server 222, as will be described in more detail below.

Figure 4:
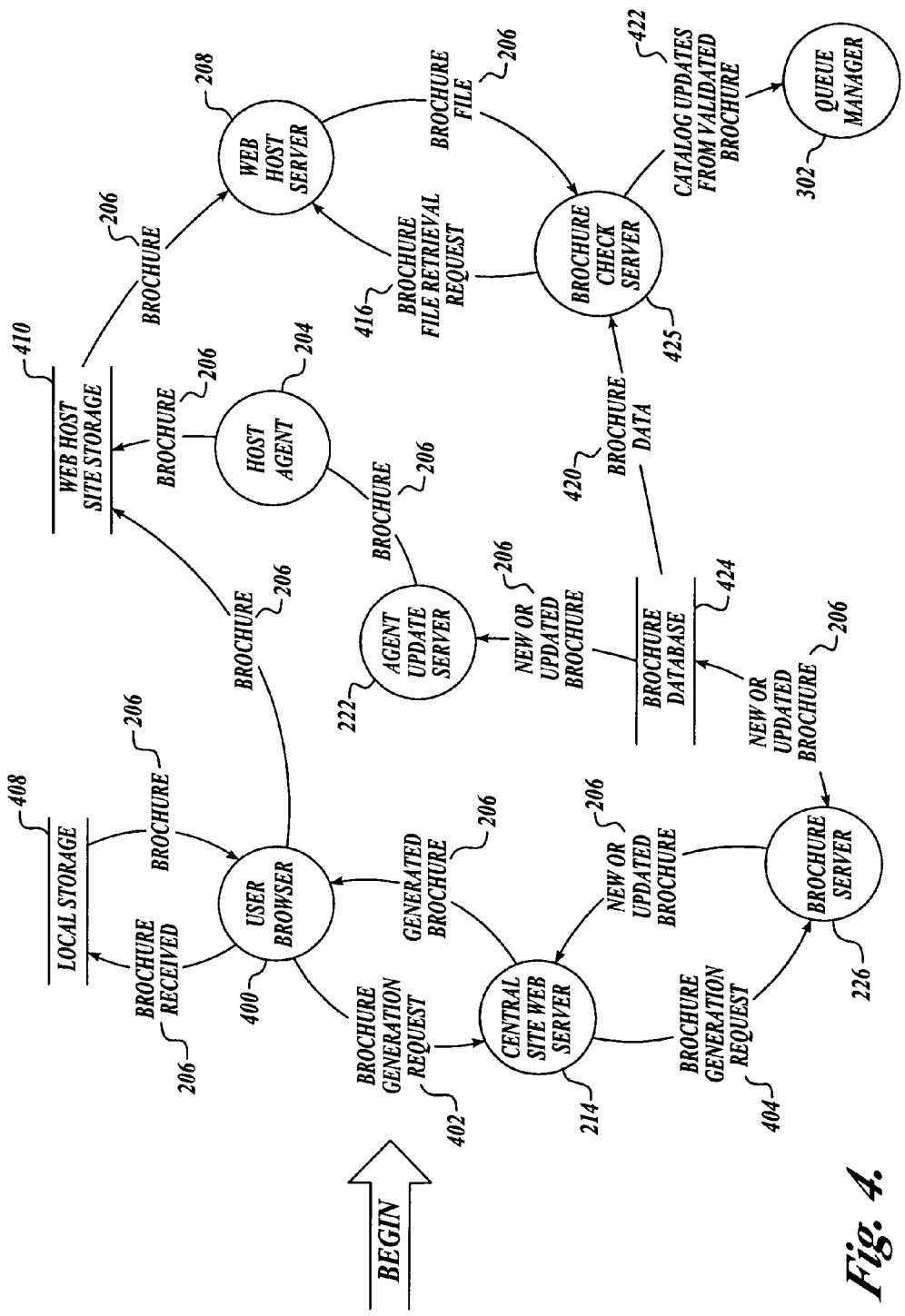
FIG. 4 is a bubble chart illustrating the generation and processing of a brochure file in the search engine system of FIG. 2.

FIG. 4 is a bubble chart illustrating the generation and processing of a brochure 206 in the indexing system of FIG. 2. As previously mentioned, the purpose of the brochure 206 is to allow the web host 208 and the web sites to provide specific non-HTML information, which will help the central server 202 in =indexing the site and provide more relevance to query results. The brochure 206 can be created in two ways. First, as part of the installation program for the agent 204, the administrator of the remote server 208 completes a form that is converted to an encoded brochure file 206, and then copied into the web directory on the remote server 208. This method of generating the brochure 206 will be discussed in more detail below. The second method of generating the brochure 206 utilizes a brochure creator interface on the web servers 214 at the central server 202. This method will now be described in more detail with reference to FIG. 4.

To create a brochure 206 using the brochure creator interface, a user's browser 400 applies a brochure generation request 402 to the associated central site web server 214. In response to the request 404, the brochure creator interface generates a form which the user completes, and then sends a brochure request 406 to the brochure server 226, which generates an encoded brochure file that is then sent to the central site web server 214. The central site web server 214 then sends the encoded brochure file to the user's browser 400. The encoded brochure file 206 is then stored in local storage 408. Subsequent to receiving the encoded brochure file 206, the user sends the encoded brochure file 206 via the user's web browser 400 to the web host site storage 410 (e.g., the web site host computer).

The brochure server 226 stores the brochure data in a brochure database 424 on the central server 202 once it has been generated as a result of a brochure generation request 404. To verify proper storage of encoded brochure files 206, the brochure check server 425 retrieves brochure data 420 from the brochure database 424 and sends a request 416 to the web host server 208 to retrieve the encoded brochure file 206 from the web host site storage 410. Upon successful retrieval of the brochure file 206, the brochure check server generates and transmits catalog update object references 422 created as a function of the brochure data 420 to the queue manager 302. The queue manager 302 thereafter updates the central index to include the generated object references.

The directory structure of the host and web site are used to determine the relevance of the information in the brochure. Information in a brochure located in a root directory will apply to all sub-directories unless superceded by another brochure. Information in a directory brochure will apply to all subdirectories unless superceded by information in a subdirectory brochure. Where a brochure is placed determines for which content the information applies. A web site owner can have as many brochures as there are pages or directories in his site. A site owner can request that their site be excluded from the Index by checking the EXCLUDE box next to the URL and copying the brochures into the directory to be excluded. An example of a host brochure is shown below in Table 1:

TABLE 1

Host Brochure

Company Information:

1. IP number
2. Domain Name Server
3. Type of Domain Name Server
   HOST - Name _____
   Company - Name _____
   Individual - Name _____
4. HOST name
5. Company Name if different
6. Contact Name
7. Address
8. Phone
9. Fax
10. Technical Contact name:
11. Technical Contact's direct phone number
12. Technical Contact's email address
13. Would you like the Technical Contact to receive email notification that of every successful site index update.
14. Business Contact name:
15. Business Contact's direct phone number
16. Business Contact's email address
17. Site Languages
18. Site Rating
19. URL/Sites to be indexed
20. URL/Sites to be excluded
    General Information: (optional)
21. Area served
22. Number of email boxes hosted _____
23. Number of Domain Names hosted _____
24. Number of web sites hosted. _____

The host uses the configuration section of the agent program to create site brochures, and can create site brochures for an entire IP address or for any subsection of the site.

In addition to the host brochure, a web site owner may also place a site brochure on his web site. The purpose of the site brochure is to allow the web site owner to provide specific conceptual or other general information, which will help in indexing their site. A sample site brochure is shown below in Table 2.

TABLE 2

Site brochure

Site Information:

1. URL for the Site directory for which this information applies
2. Top URL for this Site
3. INCLUDE or EXCLUDE URL
4. Language
5. Site Name _____ (RealName)
6. Site Description _____ (limited to 25 words)
7. Name of the site Host _____
8. Contact Name
9. Address
10. Phone
11. Fax
12. Technical Contact name:
13. Technical Contacts' direct phone number
14. Technical Contacts' email address
15. Would you like the Technical Contact to receive email notification of every successful site index update.
16. Business Contact name:
17. Business Contacts' Direct phone number
18. Business Contact's email address
19. Type of site
20. Company - Name _____
21. Organization Name _____
22. Individual - Name _____

TABLE 2-continued

Site brochure

Site Information:

23. Category
    General
    Specific Category
    Special interest
24. Related categories 1, 2, 3, 4, 5, 6, 7, 8, 9 & 10
25. Demographics Site's intended audience
    Age
    Sex
    etc.
26. Location of Site's intended audience:
    World
    Country
    State or Province
    City
    District
27. Key words (repeated words will not be indexed)
28. Key Phrases (repeated phrases will not be indexed)
29. Related Site's
30. Comments
31. Type of products for sale _____
32. Location of products database _____
33. Type of database _____ SQL or ? or ?
34. Rating
35. Rating Descriptors
36. Global Positioning System (GPS) information
37. Others to be added.

The web site owner can create a different site brochure for each page or directory on the site. For example, if the web site includes pages in different languages, the web site owner should create a site brochure for each language with keywords and categories that match the language. Once the web site owner has filled in the brochure form, they will click a button on a web page from the web server at the central server, and a web server creates an encoded html file that is then sent or download to the site owner's computer. Each encoded brochure file can be given a particular name, such as brochure-domainname-com-directory-directory-directory.html, and the site owner is instructed to copy the encoded file into the specified web directory on the site.

At anytime, the web site owner can visit the central server site, update their brochure, and download a new encoded brochure. When updating an existing brochure, the current brochure information for the URL entered will be displayed to reduce input time. Any site brochure will supercede the host brochure information, and information contained in the site brochure will be assumed to be more current and accurate and will be used by the agent for indexing purposes. A site brochure that is farther down in the directory tree from the root directory will supercede a site brochure that is above it in the directory tree. A site owner can request that their web site be excluded from the index by checking the EXCLUDE box next to the URL and copying the brochures into the directory to be excluded.

If the host or web site URL is not currently being indexed, the web server performs the following operations. First, an automatic email is sent to contacts at the host to encourage the host to install the agent. An automatic email is also sent to a contact person for the web site with a "Thank You" and a request that they ask their host to install the agent. In addition, a retrieval order is generated for the central server to retrieve the brochure file from the web site in one hour. If the retrieval order is unsuccessful, it will be repeated 2, 4, 8, 24 and 48 hours later, until successful. If still unsuccessful after 48 hours, the retrieval order is canceled. By verifying the presence of the site brochure in the specified location, unauthorized information about a site may not be created by a third party in an attempt to have their site indexed along with a more popular site. This is a common problem with existing search engines where a third party copies the keywords from a meta tag in a popular site. The bogus site with copied keywords is then submitted to a search engine for indexing, and when search queries are applied to the search engine that produce the popular site, the bogus site is also produced. This may not be done with the site brochure because the brochure is not an html page available to outside persons and because it is encrypted so even if the file is obtained, the information contained therein is not accessible.

Software to create brochures and agent programs are distributed without charge to software publishers for inclusion in their web authoring software and to web server manufactures, publishers and OEMs for pre-loading on or inclusion with their products.

In another implementation of the brochure 206, the administrator of a web site connects to the central server 202 and an interactive process between the web site and the central server is used to create a brochure. Subsequently, during the indexing processing cycle, the site agent 290 or host agent 204 downloads from the central server 202 and saves all new or updated brochures 206 for the various sites at the host computer 208. These are then processed as previously described. This method is an alternative to the method by which a site administrator creates a brochure 206 and then stores the brochure at the web site. Creation of the brochures 206 in this manner is used, for example, by a service bureau or agency to create and maintain brochures for a set of clients that wish to have professional brochure maintenance. As long as the agency holds the necessary authorization to create and maintain brochures for a client, changes can be made automatically. The agency can be notified by the central server 202 that a change to the site was made, triggering a review of the contents of the brochure 206.

Agent Processing in Detail

The agent checks the site for new, modified or deleted files. The new or modified files are indexed and the information added to or deleted from the site index or a list of additions and deletions transactions are created. The incremental changes to the site index along with a digital signature of the entire site index are sent to the central server 202 and the results logged in a site activity log maintained by the agent.

It is not necessary that a local index be maintained at the site but only that a list of digital signatures representing the site at the time of the last update be maintained. The digital signature can be used to determine whether the local site and the central index are properly synchronized and which portion of the site has changed since the last successful update. Then instructions to delete all references from the central index 218 to files located at the web host that have changed or which no longer exist are sent by the agent to the queue manager. New references are then created for all new or modified files and are sent by the agent to the queue manager as additions to the central index 218.

Figure 5:
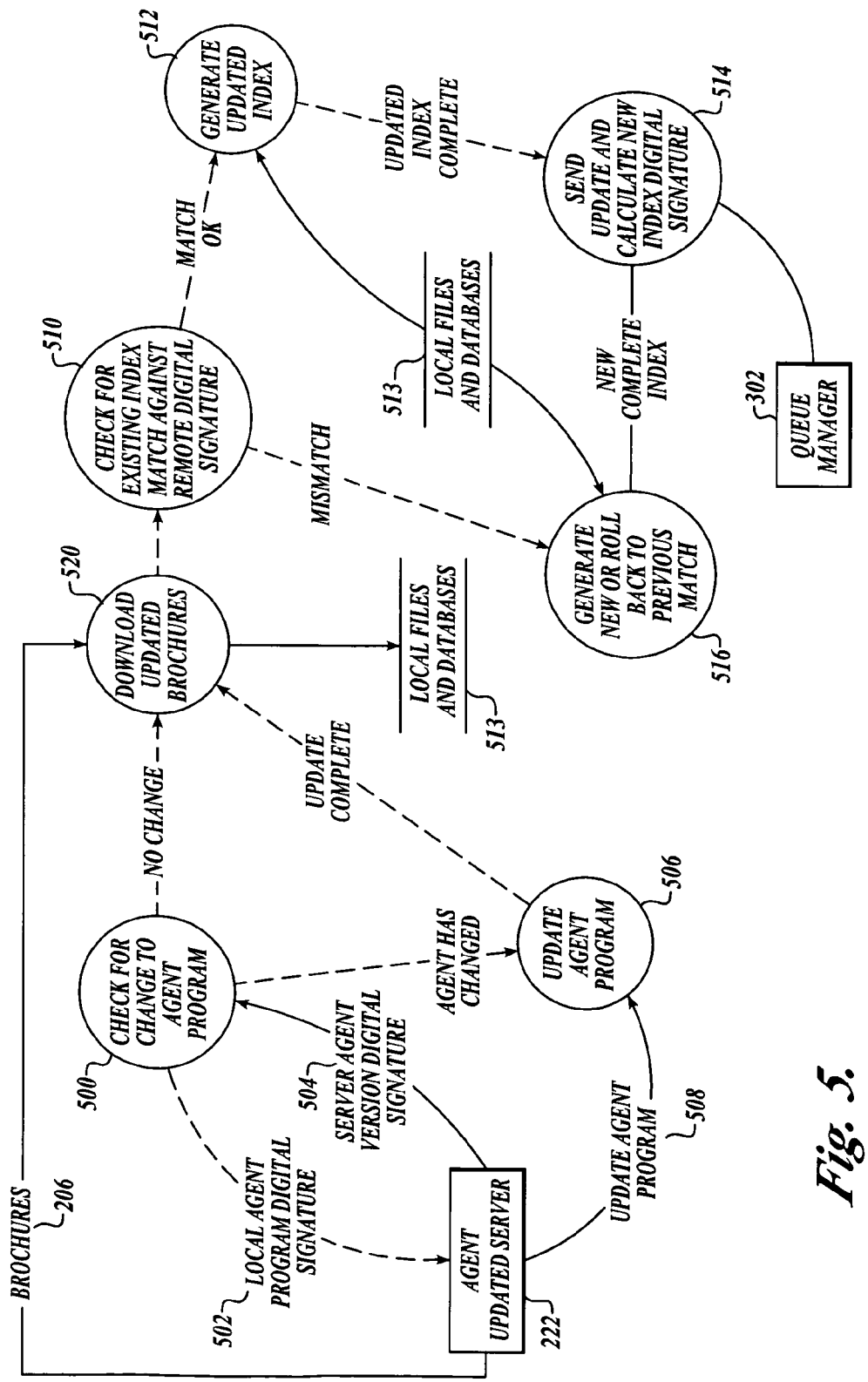
FIG. 5 is a bubble chart illustrating the process of the agent program of FIG. 2 in updating itself along with a local index generated by the agent program.

FIG. 5 is a bubble chart of the process executed by the agent 204, 290 according to one embodiment of the present invention. As previously mentioned, the agent periodically executes the illustrated process to update itself and to update the corresponding local index, as will now be described in more detail. The process begins in step 500 in which the agent verifies that it is the most current version of the agent program. More specifically, in step 500 the agent sends a request 502 to one of the update servers 222 for a digital signature hash of the current version of the agent program. The update server 222 returns the digital signature 504 for the most current version of the agent over a secure socket. In step 500, the digital signature hash of the local agent is compared to the returned digital signature hash to determine whether the local agent is the most current version. In other words, if the two digital signatures are equal, the local agent is the most recent version, while if the two are not equal the local agent is an outdated version of the agent program and must be updated. When the two digital signatures are unequal, the program goes to step 506 in which the most current version of the agent program 508 is received from the update server 222. Once the local agent program has been updated, the program proceeds to step 520. Note that if the digital signature of a local agent program is equal to the digital signature 504 of the most recent version of the agent, the program proceeds directly from step 500 to step 520.

In step 520, The agent retrieves any new or updated brochure files from the central server 202. These are placed in the local file system 513 of the host system on which the agent is executing and the process proceeds to step 510.

In step 510, the agent program compares the digital signature hash for the existing local index previously generated by the agent program to the digital signature hash stored on the central server 202 for the existing local index. The agent program performs this step to synchronize the local index and the remote local index stored on the central server 202 by ensuring the digital signature of the existing version of the local index matches the digital signature for the existing version of the remote local index. If the two digital signatures are equal, the agent program goes to step 512 and generates an updated local index by evaluating, such as by tokenizing and parsing, local files 513 on the web host serviced by the agent. Once the updated local index has been generated, the agent program proceeds to step 514 where the updates along with the digital signature of the new local index are transferred to the agent queue manager 302 on the central server.

If step 510 determines the two digital signatures are not equal, the agent program goes to step 516 to roll back to a previous state that matches the local files 513 or to generate a completely new local index for the web host serviced by the agent. After the complete new local index is generated, the agent program once again proceeds to step 514 and the updates are transferred to the queue manager 302. As previously mentioned, comparing the digital signatures in step 510 synchronizes the local index and remote local index. Furthermore, this step enables the agent program to rebuild a completely new local index for the site serviced by the agent program in the event the index is lost at the central server 202. Thus, should be central server 202 crash such that the central index is corrupted and non-recoverable, the agent programs at the each remote web host will rebuild their respective local indices, and each of these local indices will be transferred to central server 202 so that the entire central index may be reconstructed.

As mentioned above, the host agent 204 is a software program that a web host downloads from the web servers 214 and installs on the host's server. To install the agent 204, the host runs an agent installation program, which collects information about the web site host and about each site, and also creates the web site host's brochure 206 of non-HTML information. As part of the installation, the site host schedules a preferred time of day for the agent 204 to automatically index the web site and transfer index updates to the central server 202. The agent and the queue manager can work independently or together to reschedule when to perform and transmit the site update. Resource availability is the primary factor considered, and any other factor which may effect the quality or efficiency of the operation may be used by the agent and the queue manager in rescheduling updates.

In the described embodiment, the agent 204, 290 initiates all communications with the central server over a secure socket authorized and setup by the site host. But the central server 202 could also initiate communications or trigger actions of the agent or retrieve data process by the agent. All data and program updates sent between the site host and the central server are sent in compressed and encrypted form. During the normal index updating process, the agent is automatically updated, as will be explained in more detail below. The site host may receive a daily email saying the site had been properly updated or that no update was received and action is required. The agent 204, 290 also maintains a log of indexing activity and errors encountered, and this activity log can be viewed by the site host or owner by opening the agent and accessing the log. Although the agent automatically indexes the sites on the host at scheduled times, the host or site owner can at anytime initiate an indexing update by opening the agent and manually initiating an index update.

The agent also verifies the brochure files. More specifically, the agent determines if the file brochure.html file name does not match the directory in which it is located. If the file brochure.html is not in the expected directory, the agent sends a warning email to the site contact listed in the brochure, and then renames brochure.html to WrongDirectorybrochure.html.

If the agent determines that all brochure.html files match the directory in which they are located, the agent deletes a file named Exclude-File-List, creates a text file named Exclude-File-List, checks brochures for EXCLUDE sites flags, and adds file names of files to be excluded from the index to the Exclude-File-List file. The agent then creates a Deleted-File-List file containing a list of files that no longer exist on the site in their original location. More specifically the agent deletes the old Deleted-File-List file, creates a text file called Deleted-File-List; compares the Site-File-List file to Old-File-List file and records in the Deleted-File-List any files in the Old-File-List that are not in Site-File-List.

The agent then creates a New-File-List file containing a list of files that were created or modified since the last update. To create the New-File-List file, the agent deletes the current New-File-List file, creates a new text file called New-File-List, compares the file Site-File-List to the file Old-File-List and the file Exclude-File-List, and records in the New-File-List file any files in Site-File-List that are not in the Old-Site-File-List or in Exclude-File-List files.

The agent determines if the Site-index file exists, and, if yes, copies the Site-index file to an Old-index file. If the Site-Index file does not exist, the agent determines if the file Old-Site-Index exists, and if yes copies the Old-Site-Index file to Site-index file. If Old-Site-Index file does not exist, the agent copies a Sample-Site-Index file to the Site-index file.

The agent then creates a New-Records-Index file and a Deleted-Records-List file. The agent next removes records of deleted or modified files from the Site index. More specifically, the agent deletes all records from Site-Index for files in New-File-List, deletes all records from Site Index for files in Deleted-File-List, and records the Host IP, URL, and record ID Numbers for each record deleted into Deleted-Records-List.

The agent then runs an indexing program against all files in the New-File-List file and creates a record for each new key word, phrase, MP3, image, video, movie, link and brochure information and adds these to the Site-Index file. The agent then copies each new record created to the New-Records-Index file. If new fields were added to the Site Index, the agent runs the indexing program against all files for new field information and creates records in Field-Update-Index for all information found. The agent then updates the Site-index file from the Field-Update-Index file.

At this point, the Site-Index file has been updated, and the agent calculates a digital signature for the Site-index file. More specifically, the agent determines if the Update-Status file exists, and if so opens this file. If the Update-Status file does not exist, the agent creates a text file called Update-Status and opens this file. The agent then calculates the digital signature of the Site Index file, and records the Site-index digital signature along with the date and time in the Update-Status file. Next, the agent calculates the digital signature of the Site-File-List file, and records the Site-File-List digital signature along with the date and time in Update-Status file.

Finally, the agent creates a Site-Map file for the sites serviced by the agent. More specifically, the agent determines whether the Deleted-File-List or New-File-List contain files, and, if yes, the agent deletes the Site-Map file. The agent then generates a site map for the Site-Map file from the Site-File-List. Once the Site-Map file has been generated, the agent sends New-Records-Index and Deleted-Records-List files to the central server 202. More specifically, the agent opens a secure connection and contacts the central server 202. The agent then compresses the files to be sent, encrypts these files, and sends the compressed and encrypted files in the New-Records-Index, Field-Update-Index, Deleted-Records-List, digital signature for the Site-Index, Site-Map, and the Site-File-List to the central server 202, which the uses these files to update the central index. Once the agent has successfully sent this information to the client server 202, the agent records the digital signature of the Site-Index file, the time of the successful transfer, the date and size of the files transferred in the Update-Status file, and thereafter deletes the sent files.

The agent generates a site index, which is a database. The database includes a number of tables, each table consisting of records (rows) and fields (columns). Each table in the database includes similar records to speed searches. All Tables may be sorted alphabetically and then by category. In one embodiment of the agent, the agent generates Tables 3–12 as shown below.

TABLE 3

Agent Created Keywords Table Fields

| | |
|---|---|
| 1. | i. Keyword |
| 2. | Category - General, Specific, Special Interest Categories |
| 3. | Related categories 1, 2, 3, 4, 5, 6, 7, 8, 9 & 10 |
| 4. | Host IP address, |
| 5. | Site URL, |
| 6. | Unique Record Identifier |
| 7. | Location of first occurrence of word |
| 8. | URL for first occurrence of word |
| 9. | Number of occurrences of word |
| 10. | Does word appear in meta header |
| 11. | Does word appear in brochure keywords |
| 12. | Does word appear in brochure phrases |
| 13. | Demographics restrictions (Y or N) |
| 14. | Location restrictions (Y or N) |
| 15. | Date file containing Key Phrase was created |

TABLE 3-continued

Agent Created Keywords Table Fields

| | |
|---|---|
| 16. | Link to Site brochure |
| 17. | Link to Host brochure |
| 18. | Link URL Link Table |
| 19. | Html tag information |
| 20. | XML tag information |
| 21. | Ranking |

TABLE 4

Agent Created Key Phrases Table Fields

| | |
|---|---|
| 1. | ii. Key Phrase |
| 2. | Category - three letters representing General, Specific Special Interest, and Categories |
| 3. | Related Categories 1, 2, 3, 4, 5, 6, 7, 8, 9 & 10 |
| 4. | Host IP address, |
| 5. | Site URL, |
| 6. | Unique Record Identifier |
| 7. | Location of first occurrence of Phrase |
| 8. | URL for first occurrence of Phrase |
| 9. | Number of occurrences of Phrase |
| 10. | Does Phrase appear in meta header |
| 11. | Does Phrase appear in brochure phrases |
| 12. | Demographics restrictions (Y or N) |
| 13. | Location restrictions (Y or N) |
| 14. | Date file containing Key Phrase was created |
| 15. | Link to Site brochure |
| 16. | Link to Host brochure |
| 17. | Link URL Link Table |
| 18. | Html tag information |
| 19. | XML tag information |
| 20. | Ranking |

TABLE 5

Agent Created Products Catalog

| | |
|---|---|
| 1. | iii. Type of product |
| 2. | Category - three letters representing General, Specific, and Special Interest Categories |
| 3. | Related Categories 1, 2, 3, 4, 5, 6, 7, 8, 9 & 10 |
| 4. | Product description |
| 5. | Site URL, |
| 6. | Unique Record Identifier |
| 7. | iv. Product Number |
| 8. | v. Product price |
| 9. | vi. Feature or option |
| 10. | Feature or option |
| 11. | Feature or option |
| 12. | Link URL Link Table |

TABLE 6

Agent Created Articles & Documents Table

| | |
|---|---|
| 1. | vii. Type of Articles or Documents |
| 2. | Category - three letters representing General, Specific, and Special Interest Categories |
| 3. | Related Categories 1, 2, 3, 4, 5, 6, 7, 8, 9 & 10 |
| 4. | Subject of Articles or Documents |
| 5. | Site URL, |
| 6. | Unique Record Identifier |
| 7. | viii. Date |
| 8. | ix. Author |
| 9. | x. Source of Articles or Documents |
| 10. | |
| 11. | |
| 12. | Link URL Link Table |

TABLE 7

Agent Created MP3 Table Fields

1. xi. Title of Song
2. Category - three letters representing General, Specific, and Special Interest Categories
3. Related Categories 1, 2, 3, 4, 5, 6, 7, 8, 9 & 10
4. Host IP address,
5. Site URL,
6. Unique Record Identifier
7. xii. Name of Group
8. xiii. Name of Artist
9. xiv. Name of Artist
10. Name of Artist
11. Name of Album
12. Name of Record label
13. Name of producer
14. Name of MP3 file
15. Size of MP3 file
16. Year produced
17. Link to Site brochure
18. Link to Host brochure
19. Link URL Link Table

TABLE 8

Agent Created Video Table

1. xv. Name of Video
2. Category - three letters representing General, Specific Special Interest Categories
3. Related Categories 1, 2, 3, 4, 5, 6, 7, 8, 9 & 10
4. Host IP address,
5. Site URL,
6. Unique Record Identifier
7. Artists name 1
8. Artists name 2
9. Artists name 3
10. Name of director
11. Year produced
12. Name of Studio
13. Name of producer
14. Size of file
15. Link to Site brochure
16. Link to Host brochure
17. Link URL Link Table

TABLE 9

Agent Created URL Link Table

1. xvi. URL link
2. Category - three letters representing General, Specific Special Interest Categories
3. Related Categories 1, 2, 3, 4, 5, 6, 7, 8, 9 & 10
4. Host IP address,
5. Site URL,
6. Unique Record Identifier
7. URL link to other links in the Link Table.
8. Other desired information
9.
10.
11.

TABLE 10

Agent Created Site Brochure Table Fields

1. Site URL
2. Site Name _____ (RealName)
3. Site Description (limited to 25 words)
4. Name of site Host _____
5. Contact Name

TABLE 10-continued

Agent Created Site Brochure Table Fields

6. Address
7. Phone
8. Fax
9. Contact person for technical related issues:
10. Contacts' direct phone number
11. Contacts' email address
12. Contact person for business related issues:
13. Contacts' Direct phone number
14. Contact's email address
15. Type of site
16. Company - Name _____
17. Organization Name _____
18. Individual - Name _____
19. Category
20. General
21. Specific Category
22. Special interest
23. Related Categories 1, 2, 3, 4, 5, 6, 7, 8, 9 & 10
24. Demographics Site's intended audience
25. Age
26. Sex
27. Location of Site's intended audience:
28. World
29. Country
30. State or Province
31. City
32. District
33. Key words (repeated words will not be indexed)
34. Key Phrases (repeated phrases will not be indexed)
35. Related Site's
36. Comments
37. Others to be added.

TABLE 11

Agent Created Company Information from Host Brochure

1. IP number
2. Domain Name Server
3. Type of Domain Name Server
4. ISP -Name _____
5. Company - Name _____
6. Individual - Name _____
7. ISP name
8. Company Name if different
9. Contact Name
10. Address
11. Phone
12. Fax
13. Contact person for technical related issues:
14. Contacts' direct phone number
15. Contacts' email address
16. Contact person for business related issues:
17. Contacts' Direct phone number
18. Contact's email address
19. General Information: (optional)
20. Area served
21. Number of email boxes hosted _____ or N/A
22. Number of Domain Names hosted(?) _____ or N/A
23. Number of web sites hosted. _____ or N/A
24. Other Desired Information

TABLE 12

Agent Created Site Map

1. Site Map
2. IP number

Periodically, the site agent poller 291 (FIGS. 2 and 7) contacts one or more site agents 290, causing the site agent 290 to begin processing. The site agent 290 in step 520 then retrieves any new or updated brochure files from the central server 202. These are placed in the local file system 513 of the host system on which the site agent 290 is executing. Proceeding to step 510, the site agent 290 verifies that the signature of the existing index stored within the local files 513 on the web host system 208 matches that stored on the central server 202. If the index signatures do not match, execution proceeds to step 516 where the site agent 290 either generates a completely new index of the web host system 208 files or retransmits the previously generated index as stored within the local files 513. Subsequent to step 516 or if the index comparison in step 510 succeeded, execution proceeds to step 512 where the site agent 290 generates an updated index based on the content of the local files 513. Once this has been completed, execution proceeds to step 514 where the site agent 290 transmits the updated index to the site agent poller 291, and stores the updated index and its associated signature in the local files 513. The site agent poller 291 then sends the received data to the central server 202 queue manager 302.

Use of Agent with Spider Search Engine

Figure 6:
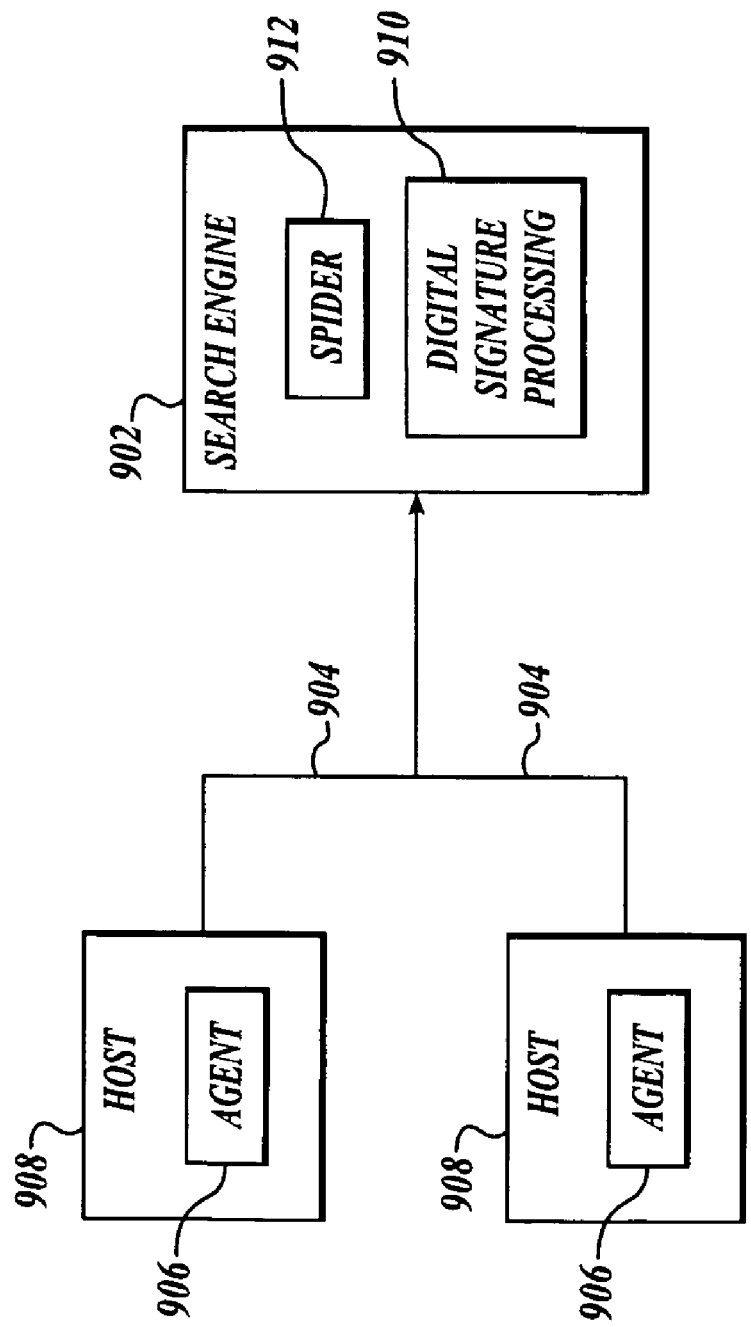
FIG. 6 is a functional block diagram of a distributed search engine according to another embodiment of the present invention.

FIG. 6 is a functional block diagram of a distributed search engine 900 according to another embodiment of the present invention. The search engine 900 includes a central search engine 902 connected over a network 904, such as the internet, to a plurality of remote server hosts 908 with agents 906. Each agent 906 generates a list of digital signatures related to retrievable information on the corresponding server 908 and provides these signatures to the search engine 902 which determines which files to access for updating its index, as will now be explained in more detail. In the following description, the server 908 is a standard web server, but one skilled in the art will appreciate that the distributed search engine 900 can be implemented for a number of other services available on the internet, including but not limited to email servers, ftp servers, "archie", "gopher" and "wais" servers. Furthermore, although the agent 906 is shown and will be described as being on the web server 908, the agent 906 need not be part of the program which processes requests for the given service.

In operation, the agent 906 periodically generates a list of signatures and accessible web pages, which are then stored on the local web server 908. The digital signature generated by the agent 906 could be, for example, a digital signature of each file on the server 908. The list of digital signatures is then transmitted by the agent 906 to the search engine 902, or the search engine 902 may retrieve the list from the servers 908. A digital signature processing component 910 in the search engine 902 then compares the retrieved digital signatures against a historic list of digital signatures for files on the server 908 to determine which files have changed. Once the component 910 has determined which files have changed, a spider 912 retrieves only these for indexing.

The digital signatures may be stored in an easily accessible file format like SGML. Alternatively, the digital signatures can be generated dynamically when requested on a page by a page or group basis. This insures that the signature matches the current state of the file. In addition, several new commands can be added to the standard http protocol. The new commands perform specified functions and have been given sample acronyms for the purposes of the following description. First a command GETHSH retrieves the digital signatures for a given URL and sends the signatures to the search engine 902. A command CHKHSH checks the retrieved digital signature for a given URL against a prior digital signature and returns TRUE if the digital signatures are the same, FALSE if not the same, or MISSING if the URL no longer exists. A command GETHLS retrieves a list of the valid URLs available and their associated digital signatures, and a command GETLSH retrieves the digital signature of the URL list.

Using the above command set, the search engine 902 need not request the entire contents of a page if that page has already been processed. Furthermore, there is no need to "spider" a site. Instead, the web server 908 provides the valid list of URLs which can then be directly retrieved. As an example, consider the following steps from the point of view of a search engine. First, given a web host 908, fetch the digital signature of the URL list. If the digital signature does not match a prior digital signature for the list, fetch the list of URLs from the web server. Thereafter, compare the list of URLs at the client web server 908 just retrieved to those stored locally at the search engine 902. From this comparison, a list of changed URLs is determined. The URLs that have changed are then retrieved and parsed for keyword and other indexing information. Once the indexing information is obtained, all URL's which do not appear in the retrieved list and the prior list are deleted from the search index on the search engine 902.

From the above description, one skilled in the art will appreciate that it is not necessary to retrieve all pages on the web site for every indexing process. Full retrieval of all web pages is necessary only once or if the entire site changes. This has several effects, the most important being that the amount of information transmitted is drastically reduced. The above method is but one possible implementation or embodiment. In another embodiment, a list of URLs on the search engine can be used and the individual checking of web pages done using the commands given. For example, the search engine 902 can tell if a page is current by simply retrieving its signature. If current, no other activity is required. Otherwise, the page might be deleted if no longer present or re-indexed if it has changed.

In a conventional search engine, the search engine normally requests that a web server deliver HTML documents to the search engine, regardless of whether the contents of the page have changed since the last recursive search. This is wasteful not only of CPU resources, but very wasteful of bandwidth which is frequently the most valuable resource associated with a web site. The waste of bandwidth affects both the web site and the search engine. Thus, current search engines and content directories require regular retrieval and parsing of internet-based documents such as web pages. Most search engines use a recursive retrieval technique to retrieve and index the web pages, indexing first the web page retrieved and then all or some of the pages referenced by that web page. At present, these methods are very inefficient because no attempt is made to determine if the information has changed since the last time the information was retrieved, and no map of the information storage is available. For example, a web server does not provide a list of the available URLs for a given web site or series of sites stored on the server. Secondly and most importantly, the web server does not provide a digital signature of the pages available which could be used to determine if the actual page contents have changed since the last retrieval.

Another alternative embodiment of the process just described is the automated distribution of a single web site across multiple servers. For example, a master web site would be published to a single server. Periodically, a number of other copy servers would check the master server to see if any pages have been added, removed or changed. If so, those pages would be fetched and stored on the requesting copy server.

Yet another alternative embodiment is the construction of meta indexes generated as lists of URLs from many different web servers. A meta index of URLs would be constructed as a graph containing the list of all URLs on the various servers and the links between them as well as the titles of the URLs, rather than the actual contents of the documents in which the URLs are embedded. Such a meta index would be useful as a means of providing central directory services for web servers or the ability to associate sets of descriptive information with sets of URLs. The method could also be used to create directory structure maps for web sites, as will be appreciated by one skilled in the art.

User Generation of Brochures

Figure 7:
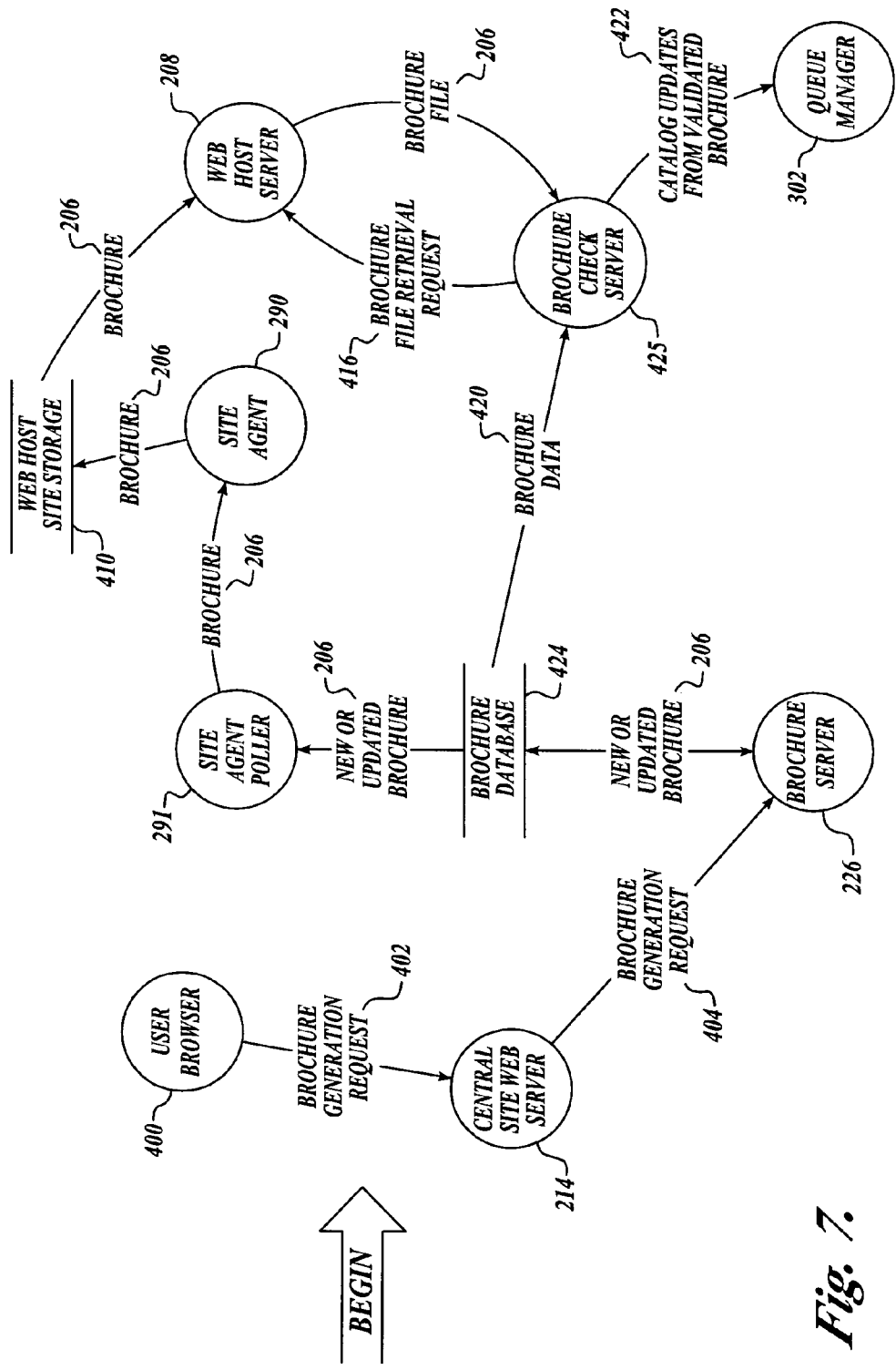
FIG. 7 illustrates an embodiment of the process by which a user operating a user web browser generates a brochure and by which that brochure is processed by the site agent and subsequently verified by the brochure check server.

FIG. 7 illustrates an embodiment of the process by which a user operating a user web browser 400 generates a brochure and by which that brochure is processed by the site agent 290 and subsequently verified by the brochure check server 425. Execution begins at the user web browser 400 which transmits a request 402 to generate a brochure to the central site web server 214. The central site web server 214 then transmits a brochure generation request 404 to the brochure server 226. The brochure server 226 generates a new or updated brochure 206 and stores it in the brochure database 424. At some future time, the site agent poller 291 transmits the new or updated brochure 206 to the site agent 290 during processing. The brochure 206 is stored by the site agent 290 within the web host site storage 410. At some time after the site agent 290 has stored the brochure 206, the brochure check server 425 will send a request 416 to the web host server 208, which subsequently retrieves the brochure 206 from the web host site storage 410 and transmits the brochure file 206 to the brochure check server 425. The brochure check server 425 then verifies the content of the brochure 206 and subsequently sends a series of catalog updates 422 to the queue manager 302 for use at the central site 202.

Application to Intranets

The indexing system may be used not only on the global communications network but on corporate intranets as well. A typical corporate intranet includes a central location, such as a corporate headquarters, at which a central searchable database is maintained, and a number of remote locations, such as regional offices or stores, coupled to the central location through a network. Each remote location transfers data to the central location for storage in the central database. The remote locations may also search the central database for desired information.

In transferring data from each remote location, data is typically stored at the remote location and then transferred to and replicated at the central location. One of four methods is generally used to update the central database, as previously discussed above under the Background section. First, all remotely stored data is copied over the intranet to the central location. Second, only those files or objects that have changed since the last transfer are copied to the central location. Third, a transaction log is kept at the remote location and transmitted to the central location, and the transaction log this then applied at the central location to update the central database. Finally, at each remote location a prior copy of the local data is compared to the current copy of the local data to generate a differential record indicating changes between the prior and current copies, and this differential record is then transferred to the central location and incorporated into the central database.

Each of these methods relies on duplicating the remote data, which can present difficulties. For example, redundant hardware at the remote and central locations must be purchased and maintained for the storage and transfer of the data over the intranet. Data concurrency problems may also arise should transmission of differential data from the remote locations to the central location be unsuccessful or improperly applied to the central database. Furthermore, if the intranet fails, all operations at remote locations may be forced to cease until communications are reestablished. A further difficulty is the author's loss of authority over his document and the responsibility for retention and data management decisions. In a centralized intranet, unregulated retrieval of objects from the central database to local storage can creates version control problems. Difficulty in handling revisions to an object may also arise in such a centralized system, with simultaneous revision attempts possibly causing data corruption or loss. Finally, in a centralized system the size of the central database can grow to the point where management of the data becomes problematic.

With the architecture of the invented indexing system, everything, including each field in a local database, is treated as an object. Instead of copying each object to a central location, an object reference is created at each local site and sent to a cataloging location or locations. The objects are not duplicated in a monolithic central database. One advantage to this architecture is that the decision of whether to expose the existence and classification of local objects becomes the responsibility and choice of the author, rather than a generic decision. In the system, the implementation of retention rules and the physical location of the objects remain with the author. The searchable central catalog merely references the distributed objects, eliminating the need to make full copies and therefore manage a large storage system. Each local site generates and transfers indexing information to the central server 202, or to a plurality of central servers for use in a searchable catalog.

Indexing Based on Concepts

The agent may also implement aspects of a conceptual database or "ontology" such as the Cyc conceptual database. The Cyc conceptual database is referred to as an "ontology" of knowledge and semantic relationships, and was originally designed as a means of developing an artificial intelligence network which understood "common sense", or the rules and facts about the world that a typical teenage person in an industrialized nation might know. The Cyc project was first started in 1984, and has been in process since that time. At this point, the Cyc ontology contains roughly one million facts and rules, most having been entered by hand over the past 15 years. The Cyc project was started as a means for creating useful generalized artificial intelligence and, more specifically, as a means for creating algorithms that implement human common-sense type reasoning and knowledge.

When practical artificial intelligence was first investigated, the problem of contextual knowledge appeared fairly early. It was found that a certain amount of information about the knowledge space (i.e., the ontology) in which an artificial intelligence system operated had to be present in order for that system to be useful. Expert systems, for example, contain ontologies that occupy a limited context space. A medical expert system, for example, does not process any context related to financial information. More sever context problems appeared when researchers began investigating the possibilities for creating true robots that could perform everyday tasks. For example, a test robot was instructed to stack wooden blocks on the floor. The robot got everything right except gravity, causing the robot to attempt to put the top block in place first rather than the bottom.

If the robot in the above example had access to the Cyc knowledge base, it would have known that gravity required the lowest block to be placed first. This is a simple example of what the Cyc ontology is capable of providing. One of the more recent uses of the Cyc ontology is in tests to determine its best usage for search applications such as web portal sites. Cycorp, the owner of the Cyc ontology, has also been investigating the automated creation of concept summaries based on the content of text documents. Concepts related to a particular document are also given relative strengths so that a weak or strong relationship with a given concept can be established. This permits the development of associative connections with concepts, something the human mind does all the time and which cannot be done easily at this time by any search engine.

The Cyc ontology in combination with the present invention agent and central index on the server 202, would allow the central index to offer a concept-based index of the Internet rather than just a keyword and category index. A concept as represented in the Cyc knowledge base (KB) is a string of characters, typically composed of several concatenated words, with special prefix identifiers. For example, #$FordMotorCompany. Relationships may be given as (is a #$FordMotorCompany #$CorporationBusinessEntity) where "isa" is a function which creates the assertion that the entity known as "Ford Motor Company" is a business entity, specifically a corporation (which in itself has several characteristics, assertive statements and relationships described elsewhere in the knowledge base). Instead of searching for keywords which might or might not provide unambiguous or reasonably limited results, concepts could be searched for in combination with keywords so that the user could find pages within a specific context or association. For example, a string search might be performed for all entities containing "ford". In this example, "#$FordMotorCompany" would be found, and the user could then search the database for all references to the defined concept. Since there are relationships and assertions defined for this entity, related entities and concepts could be linked through the knowledge base to provide searches based on deductive inferences developed through the use of the knowledge base. For example, the first search hit might point to the web site for Ford Motor Company, but a series of sublistings might refer to the various automobile models that Ford produces as well as links to crash survival statistics, etc.

This is potentially the most powerful search system that could be built for the Internet at this point. It would permit any searcher to have the benefit of access to all associative links for any given set of documents with relative ranking of association relevance, something not possible with traditional keyword search engines. Furthermore, classification of documents would no longer be a matter of simply organizing such documents by category, though that would still be useful. Instead, documents would be classified by their relevance to a given concept. A search might initially produce a set of concepts related to the search term, along with their relevance. A subsequent query might ask the system to list all documents matching the concept chosen and at the relevance level originally determined. A user could perform a search, for example, for all material generally related to clay. This would result in links to documents containing information about things related to ceramics, which covers a number of topics, including obscure references like nonferrous magnetic material, which than could lead to things like the design and manufacture of loudspeakers using ceramic magnets.

There are a number of possible implementations of an integration between the Cyc ontology and the system of FIG. 2. In a first implementation, the agent would use a local copy of the ontology to classify documents as they are found, and to assign concepts and the concept of relevancy strength to each document during parsing. The agent would thereafter store these concepts as standard name/value pairs, which the agent would send to the central index along with all other data. This data would then be placed in the central index for subsequent use in searches. To implement this system, a copy of the ontology matrix would be stored locally with the agent, and the agent would load the ontology or parts of it as required to perform processing of each local file.

In a second implementation, the agent would transmit a tokenized copy of the documents found at the site to a holding area at the central server 202. Tokenizing a document is a process by which the document is converted into a list of unique words and/or phrases by separating the text using common delimiters such as spaces. Unimportant or connective words (often referred to as "stopwords") are discarded during the process to reduce storage requirements. Such words include "the", "and", "when", etc. Punctuation is usually removed and most numeric values are discarded. For the purposes of using the Cyc ontology, the system would not remove duplicate words or destroy the order of the words as culled from the document, though this process is normally performed on documents prior to use in most indexing systems. Upon receipt of the tokenized copy, the central server 202 would parse the tokenized documents and use a central copy of the Cyc ontology to create the required concept values in the name/value pairs which would subsequently be applied to a central index at the server 202. The tokenized document would essentially contain a list of all words found in the document, along with special tokens denoting separation of words by stop words so that the relationships could be maintained for processing.

Additional Agent Functions

In addition to the previously described functions of the agent, the agent may be configured to perform a variety of additional functions in a distributed manner, and examples of such functions will now be described in more detail.

The agent may also be utilized to perform a variety of data transformations in a distributed manner. For example, the agent could perform optical character recognition (OCR) in which the images of web pages processed by the agent are interpreted and transformed to permit extraction of the text graphically represented within the image contents. The agent could also perform data transformations such as image feature extraction, where the unique statistical and logical characteristics of image files processed by the agent are determined and forwarded to a central site for later use in pattern matching or other activities. In either of these situations, the agent first performs the data transformation and thereafter transfers results to a central site, which is to be contrasted with first transmitting the images from one computer to another for processing or storing images in a database from which they are extracted and then compared on demand. Further data transformation method that may be executed by the agent include spectral extraction applied to audio data files that are processed by the agent. The spectral information generated by the agent may then be forwarded to a central site for later use in pattern matching or other activities. Spectral information can be used by pattern recognition systems for voiceprint identification and "like sound" matching, as will be understood by those skilled in the art.

During operation, the agent can parse local image files to extract "features" contained within the images. For example, a file containing a picture of a face can be reduced to a series of outlines, which may then be converted to a set of vectors.

This information can then be transmitted by the agent to the central index on the central server 202 where it is available for use in general searches. When searching images only, the vectors may be used to check similarity between images. This is a function similar to what is performed during optical character recognition ("OCR"). In OCR, letters are recognized as a series of arcs rather than a raw bitmap, allowing multiple-font and multiple-point size recognition without requiring example bitmaps of all possible combinations. In terms of the central index on the server 202, the vector information becomes a series of searchable data pairs stored in the central index.

A vector data set for images would typically be stored as a series of numbers, where each vector would be stored as a series of numeric values representing a point and line segment (length, initial direction and arc radius). This is similar to the data used in modern optical character recognition systems which determine what letter is printed on a page by determining stroke and weight. A stroke is an arc or line, while weight is the relative density of that line. By combining arcs and lines and determining the weight of these at various points, a letter can be deduced. Images of objects or scenes are similar. The general character of the image can be determined by detecting edges (relatively sudden boundaries between texture or color) between features within the image. For example, a picture of a tree may be reduced to an outline of the tree and the resulting outline stored as a series of line segments. Such data may be searched by providing a similar shape to that of the object being searched for, then applying comparison algorithms against data in the system. While scale (size) and orientation may change, the vectors defined for similar objects stored in the index will remain proportionally related.

IBM (International Business Machines, Inc.) has developed an image search technology which uses a technique similar to the one described above to find bitmaps stored in a DB2 database field. Keywords are used initially to find an image, which is then used as a template for subsequent search requests. IBM has disclosed in a patent the image feature extraction system and the algorithm used to compare the image vectors (data sets that numerically describe the salient features of the image). When combined with the present invention, the vectors would be stored in the central index rather than the entire bitmap, and searches would be performed on this data by a query processor supplying an initial vector data set. There is no way to reconstruct the image from the vectors, so a sample image converted to vectors would have to be selected by the user to initiate a search.

The approach outlined here could also be used for comparing audio files by extracting frequency spectrum series (or other statistical data or features) from audio files stored at the location where the agent is run, then transmitting this information as data pairs to the central index. Searches are performed by finding a representative audio sample or supplying the vectors for a representative sample, then refining the search based on similarities in audio data with other files referenced by the system. Techniques currently used in speech recognition could be used as the basis for such a search system. In both of these examples, the file or page being indexed is actually a nontext file, and the name/value pairs associated with that page are vector quantities derived after processing in addition to keywords or other textual information.

The agent may also apply artificial intelligence ("AI") algorithms in parsing local objects and generating corresponding data for indexing the objects being parsed. Artificial intelligence encompasses a number of specific fields as well as generally describing the use of a set of data processing algorithms to automatically manipulate or interpret data, as will be understood by those skilled in the art. Artificial intelligence algorithms are typically used for the statistical reduction of data based on patterns found in the data, and then logical decisions are made as a function of the statistics generated from the data. For example, optical character recognition ("OCR") systems use a semantic network to make "reasonable" guesses about what a group of letters represents based on that series relationship with other groups of letters. It is common for an OCR system to convert the word "all" to "al I" in the first-pass processing layer. Subsequently, the semantic network is applied to the sentence with the misinterpreted word, and the word is changed to "all" since that is a more "reasonable" guess within the context of a typical sentence. Usually, there is a "certainty factor" which may be adjusted by the user to allow for a range of accuracy based upon the amount of time available for processing (more accuracy requires more processing time).

The agent may utilize AI algorithms in a number of applications for processing local pages and other local files. For example, the agent could perform OCR on bitmap files found on a web site and thus produce keywords for the text represented by the bitmaps. In another application, the agent uses a contextual database to determine static ranking or relevance information, with the detection of an adult site based on total site content being an example of this type of AI analysis of local files by the agent.

The agent may also be used to determine the relative importance of a document as a source or reference of information stored in linked documents. As an example of adult site detection, the agent might use a database consisting of a list of the words typically found within an adult site and the context in which they typically occur (surrounding words and word types such as nouns or verbs.) If a site was found to have a significant occurrence of the words in the proper context, it might then be classified as an adult site. This approach may be used for other site types, where the context and occurrence of certain trigger words generally indicates the type of site with a reasonable amount of certainty. There are a myriad of possible uses of AI algorithms by the agent, with many such uses being directed to the detection and classification of patterns found in the source data at a web site and a subsequent generation of name/value pairs based on those classifications.

Companies have developed search engine technologies that search based upon pattern matching and content weighting techniques. For example, IBM has developed Query By Image Content ("QBIC") and a system known as the CLEVER system, as will be described in more detail below. The QBIC and CLEVER systems would be capable of using data produced by the agent for image, audio, and link information. The QBIC system uses a pattern-matching engine embedded into an IBM DB2 database system to compare image characteristics against a sample image. The results of such comparisons are then retrievable via a Structured Query Language ("SQL") statement. The QBIC system is intended for use in a keyword environment, where a keyword search produces an initial set of images which are then used as comparison templates and compared against the pattern-matching engine. The CLEVER system determines information source documents or "hubs" from URLs collected from one or more web sites. This is similar in concept to the methods described this year in a Scientific American article, but the CLEVER system is actually running. A source document is one that is referenced by many web pages or URLs, sometimes several levels removed from the document itself. A hub is defined as a page containing a series of links to other sites or source documents, and is often referred to as a "links" page.

In both the QBIC and CLEVER systems, a source index or collection of information is required. In the case of a technology like the QBIC system, the agent could convert the contents of an image found on a local server into a series of vector values stored in standard name/value pairs and transmit these to the central server 202 for later use in image matches. In this embodiment, the name/value pair might consist of the word "VECTOR" followed by a delimiter and then a list of numbers which define the vector as a point, line segment or arc. For the CLEVER system, the agent could produce a list of URLs as source/destination links and include these as name/value pairs. Essentially, the agent would act as a local data collection and preprocessing system which removes the burden of processing from a central system, and eliminates the necessity of storing central copies of the source data.

In addition to the QBIC and CLEVER systems, this type of operation by the agent could be applied to any system which requires transformation of source data into a series of data points. A sound file, for example, can be represented either as the time-series data (the actual digitized sound) or as frequency-series data as produced by an FFT (Fast Fourier Transform). The FFT is a data transformation and reduction technique, central to many technologies, which theoretically allows the representation of any complex waveform as the sum of a set of sine waves occurring at various harmonic intervals, phases and strengths. Using the data sets provided by an FFT is much more effective for pattern matching in audio data than using the time-series data, and is a universal format for representing discrete periods of sound. Using the agent, local data transformations may be performed in a distributed manner, unloading the processing overhead from a central site. For example, if it is desired to catalog the outlines of all objects contained in a large number of images contained on a large number of web servers, each agent can perform "edge detection" on corresponding local images to thereby locally determine the outlines of such objects. The agent thereafter transmits coordinate sets to a central server or other desired local instead of first uploading the images to a central site and then performing the edge-detection and outline determination at the central site.

The agent may also be utilized to execute statistical analysis by collecting and reporting information about the host on which the agent is running, as well as statistical data about the files to which the agent has access. This statistical information may be transmitted to a central site for relevancy rankings or other purposes. The agent may also be utilized in the semantic interpretation of data. In this type of operation, the agent processes text extracted from files accessed by the agent and then creates symbolic representations of relationships between words and symbolic representations of concepts found in the various combinations of words. These concepts and relationships may then be transmitted by the agent to a central site for use in various operations.

The agent may also be utilized in a detection and transmit mode. In this mode of operation, the agent monitors objects stored on the remote server 208 and detects changes in files stored on the servers. The agent could detect such changes by, for example, detecting a change in the date in the file header, indicating the file has been updated since last processed by the agent. Upon detecting objects on the remote server 208 that have been changed, the agent transfers these files to the central server 202 for processing. At the central server 202, such objects are then parsed and otherwise processed and the information regarding such objects is added to the central index. Alternatively, the modified objects may be stored at the central site and used for later search queries applied to the central site. The detection and transmit mode could be utilized by conventional spidering search engines to thereby minimize the burden experienced by the spiders used with such sites to retrieve web pages added to the Internet. By using the agent, only modified objects are processed at the central server 202. In contrast, a conventional spider merely accesses objects stored on a host site, and these objects are transferred to the central search engine site and thereafter processed regardless of whether they have been modified since the last time the objects were processed.

The agent may similarly operate in a differential-file mode in which it processes blocks within a given file, detects changes within such blocks, and thereafter transmits information about such block changes to the central server 202. In this way, the agent only transfers information for blocks that contain changes instead of transferring changes for the entire file when any change in the file is detected.

According to another embodiment of the agent, the agent calculates a value representing the difference in contents between objects, such as the number of text phrases used in both objects, and thereby determines which objects at a site are most likely to relate to each other. At the cataloging site, these relationship values are combined with the relationship values from other sites to create a relationship value table. This relationship value table represents the likelihood of an object occurring together with another object. This table may be used to refine searches and create relevance ranking.

The agent can process any type of object stored on the remote server 208, such as web pages and video and audio files, and may also process files containing voice recognition, smell, and tactile information, as well as myriad other file types.

The agent could be included as a utility or component of an operating system. For example in Windows the "Find" utility as previously discussed allows a user to locate files on his computer, and the agent could be included in an analogous way as part of Windows or any other operating system such as Unix.

In yet another implementation of the agent, the agent queries web sites other than the web site and host on which the agent is contained, generates index information for files on such web sites, and thereafter transfers this information to the central server 202.

Enhanced User Queries

A natural language query system may also be utilized in the system of FIG. 2. More specifically, a natural language query system may be used to provide one of two possible search requests to the central index on the central server 202. In the first case, a natural language parser is used to create keyword search terms using Boolean operators which would then be applied to the central index. This would be a typical application in relationship to a portal customer of the system of FIG. 2, such as AskJeeves, that has an existing natural language interface and an interface to a keyword engine. In addition to keywords, the natural language interface might also specify the type of document or document classification within a hierarchy. In a second situation, the natural language front-end would be used to create a query of concepts as well as keywords which could then be applied to the search engine. Separate searches would be performed in concept space as well as keywords space, and resulting sets of documents would be compared to produce a final search result list. This would be the application created as a result of the combination with the Cyc ontology and the concept index stored on the central server 202.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the stated claims.

What is claimed is:

1. A method for constructing a catalog of object references corresponding to objects stored within a network, the network including a plurality of interconnected computers with at least one computer storing the catalog, each computer storing the catalog being designated a cataloging site, and the other computers on the network storing a plurality of objects and being designated source sites, the method comprising:
   running on each source site an agent program which processes the contents of objects stored on the source site and generates meta data for each processed object which describes the object;
   transmitting the generated meta data from each host site to at least one cataloging site; and
   aggregating the transmitted meta data at each cataloging site to generate the catalog of object references.

2. The method of claim 1 wherein at least one source site is also a cataloging site.

3. The method of claim 1 wherein the transmitted meta data further comprises a command to the cataloging site operable to instruct the cataloging site.

4. The method of claim 1 wherein transmitting the assembled meta data comprises transmitting differential meta data indicating changes in current meta data relative to previous meta data.

5. The method of claim 1 wherein the agent program creates meta data only for selected objects on the source site, the selected objects selected by user input.

6. The method of claim 1 wherein the agent program creates meta data only for selected objects on the source site, the selected objects selected by a computer algorithm.

7. The method of claim 1 wherein the contents of at least some of the objects stored on a source site comprises nontextual data and the meta data comprises one or more vectors extracted from the contents.

8. The method of claim 7 wherein the nontextual data comprise one or more digital image files and the vectors for each object stored on a source site correspond to features in the image file.

9. The method of claim 7 wherein the nontextual data comprise one or more digital audio files and the vectors for each object stored on a source site correspond to frequency domain analysis of the audio file.

10. The method of claim 1 wherein the agent program comprises a utility program that is resident in an operating system on the corresponding source site.

11. A method for constructing a catalog of object references on a cataloging computer on a computer network, the computer network further including a plurality of interconnected source computers, comprising:
    running on each source computer an agent program which accesses a file system structure of the source computer and creates a data set which specifies the file system structure;
    transmitting at the initiation of each source computer the data set from the source computer to the cataloging computer; and
    processing the transmitted data sets at the cataloging computer to generate the catalog of object references that correspond to the transmitted data sets.

12. The method of claim 11 wherein the file system structure comprises a plurality of directory entries for files stored on the corresponding source computer.

13. The method of claim 11 wherein each source computer is also a cataloging computer.

14. The method of claim 11 wherein the transmitted data further comprises a command to the cataloging computer operable to instruct the cataloging computer.

15. The method of claim 11 wherein transmitting the data comprises transmitting differential data indicating changes in a current data set relative to a previous data set.

16. The method of claim 11 wherein only a portion of the file system structure is selected.

17. The method of claim 11 wherein only a portion of the file system structure is selected by user input.

18. The method of claim 11 wherein only a portion of the file system structure is selected by a computer algorithm.

19. The method of claim 11 wherein the agent program comprises a utility program that is resident in an operating system on the corresponding source computer.

20. A method for constructing a catalog of object references to objects on a site in a network, the network including a plurality of sites and the objects on the site not being accessible to other sites on the network, comprising;
    running on the site a agent program that generates meta data from the contents of objects on the site, and
    assembling the meta data to construct the catalog of object references that correspond to the contents of the objects.

21. The method of claim 20 wherein the catalog is stored on the same site as the objects.

22. The method of claim 20 wherein the catalog is assembled on a central site which is not the site where the objects are located.

23. The method of claim 20 wherein object references remain in the catalog although an object corresponding to an object reference no longer exists.

24. The method of claim 20 wherein the catalog comprises object references to objects stored on a plurality of sites, the object references aggregated and stored on a central site.

25. The method of claim 20 wherein the agent program creates meta data only for selected objects on the site, the selected objects being selected by user input.

26. The method of claim 20 wherein the meta data further comprises a command operable to instruct the site.

27. The method of claim 20 wherein the contents of at least some of the objects comprises nontextual data.

28. The method of claim 20 wherein the agent program comprises a utility program that is resident in an operating system on the site.

29. A method for constructing a catalog of object references from objects stored within a network, the network including a plurality of interconnected computers with one computer storing the catalog and being designated a cataloging site and each of the other computers storing a plurality of objects and being designated a source site, the method comprising:
    receiving at the cataloging site, meta data about objects stored on each source site, the meta data generated by an agent program stored on each source site, the agent program processing objects stored on the host site and generating corresponding meta data; and processing the received meta data at the cataloging site to generate the catalog of object references.

30. The method of claim 29 wherein the transmitted meta data further comprises a command to the cataloging site operable to instruct the cataloging site.

31. The method of claim 29 wherein the agent program creates meta data only for selected objects on the source site, the selected objects being selected by user input.

32. The method of claim 29 wherein the agent program comprises a utility program that is resident in an operating system on the corresponding source site.

33. A computer-readable medium containing computer-executable instructions for constructing a catalog of object references about objects stored on a source site in a network, the network including a plurality of sites, the objects on the source site not being accessible to other sites on the network, the computer-executable instructions operable for:
running an agent program for generating meta data corresponding to the contents of objects on the source site, and
assembling said meta data to construct a catalog of object references,
wherein the catalog is stored on the same site as the objects.

34. The computer-readable medium of claim 33 wherein object references remain in the catalog although an object relating to an object reference no longer exists.

35. The computer-readable medium of claim 33 wherein the catalog comprises object references to objects stored on a plurality of sites, these object references being aggregated and stored on a central site.

36. The computer-readable medium of claim 33 wherein the agent program creates meta data only for selected objects on the source site, the selected objects being selected by user input.

37. The computer-readable medium of claim 33 wherein the meta data further comprises a command operable to instruct the source site.

* * * * *